United States Patent
Herrick

(10) Patent No.: US 7,598,910 B2
(45) Date of Patent: Oct. 6, 2009

(54) DIRECTION FINDING AND MAPPING IN MULTIPATH ENVIRONMENTS

(75) Inventor: David L. Herrick, Mont Vernon, NH (US)

(73) Assignee: Herrick Technology Labs Inc., Manchester, NH (US)

( * ) Notice: Subject to any disclaimer, the term of this patent is extended or adjusted under 35 U.S.C. 154(b) by 0 days.

(21) Appl. No.: 11/480,084

(22) Filed: Jun. 30, 2006

(65) Prior Publication Data

US 2007/0115174 A1    May 24, 2007

(51) Int. Cl.
*G01S 5/02* (2006.01)
*H01Q 3/00* (2006.01)
*G01S 13/00* (2006.01)
*G01S 7/40* (2006.01)

(52) U.S. Cl. .................. 342/420; 342/360; 342/174; 342/175

(58) Field of Classification Search ............ 342/420, 342/421, 360, 174, 175
See application file for complete search history.

(56) References Cited

U.S. PATENT DOCUMENTS

| 3,537,008 | A | * | 10/1970 | Lakatos | 455/65 |
| 4,197,537 | A | * | 4/1980 | Follen et al. | 342/27 |
| 4,348,772 | A | * | 9/1982 | Leland et al. | 455/260 |
| 4,595,925 | A | * | 6/1986 | Hansen | 342/123 |
| 5,696,514 | A | * | 12/1997 | Nathanson et al. | 342/36 |
| 5,957,982 | A | * | 9/1999 | Hughes et al. | 701/13 |
| 6,347,234 | B1 | * | 2/2002 | Scherzer | 455/562.1 |
| 6,501,747 | B1 | * | 12/2002 | Friedlander et al. | 370/342 |
| 6,650,230 | B1 | * | 11/2003 | Evans et al. | 340/10.4 |
| 6,671,499 | B1 | * | 12/2003 | Ylitalo et al. | 455/101 |
| 6,778,130 | B1 | * | 8/2004 | Bevan et al. | 342/174 |
| 2002/0138229 | A1 | * | 9/2002 | Wilborn et al. | 702/142 |
| 2005/0225481 | A1 | * | 10/2005 | Bonthron | 342/175 |

OTHER PUBLICATIONS

R. H. Clarke: "A statistical Theory for Mobile Radio Communications," Bell System Technical Journal, Jul. 1966, 47, pp. 967-1000 (To Follow).
Rodney Vaughan and Jorgen Bach Andersen, "Channels, Propagation and Antennas for Mobile Communications," The IEE, Electromagnetic Waves Series: No. 50, pp. 327-328 and pp. 427-428.

\* cited by examiner

*Primary Examiner*—Thomas H Tarcza
*Assistant Examiner*—Harry Liu
(74) *Attorney, Agent, or Firm*—Davis & Bujold, P.L.L.C.

(57) ABSTRACT

Determining the direction of a direct arrival path between a receiver and a transmitter in a multipath environment by determining a transmitter heading relative to the receiver as proportional to a frequency offset of the direct path signal component relative to a multipath pedestal, an absolute velocity of the transmitter as proportional to a width of the multipath pedestal, a relative velocity between the transmitter and the receiver as proportional to a magnitude and a direction of doppler shift of the direct arrival component of the received signal relative to the doppler pedestal, and an amplitude of the multipath pedestal as proportional to a number and magnitude of scatterers in the multipath environment. The method is applied for continuous wave and modulated signals, for stationary and moving transmitters and for tracking and mapping transmitter paths.

7 Claims, 24 Drawing Sheets

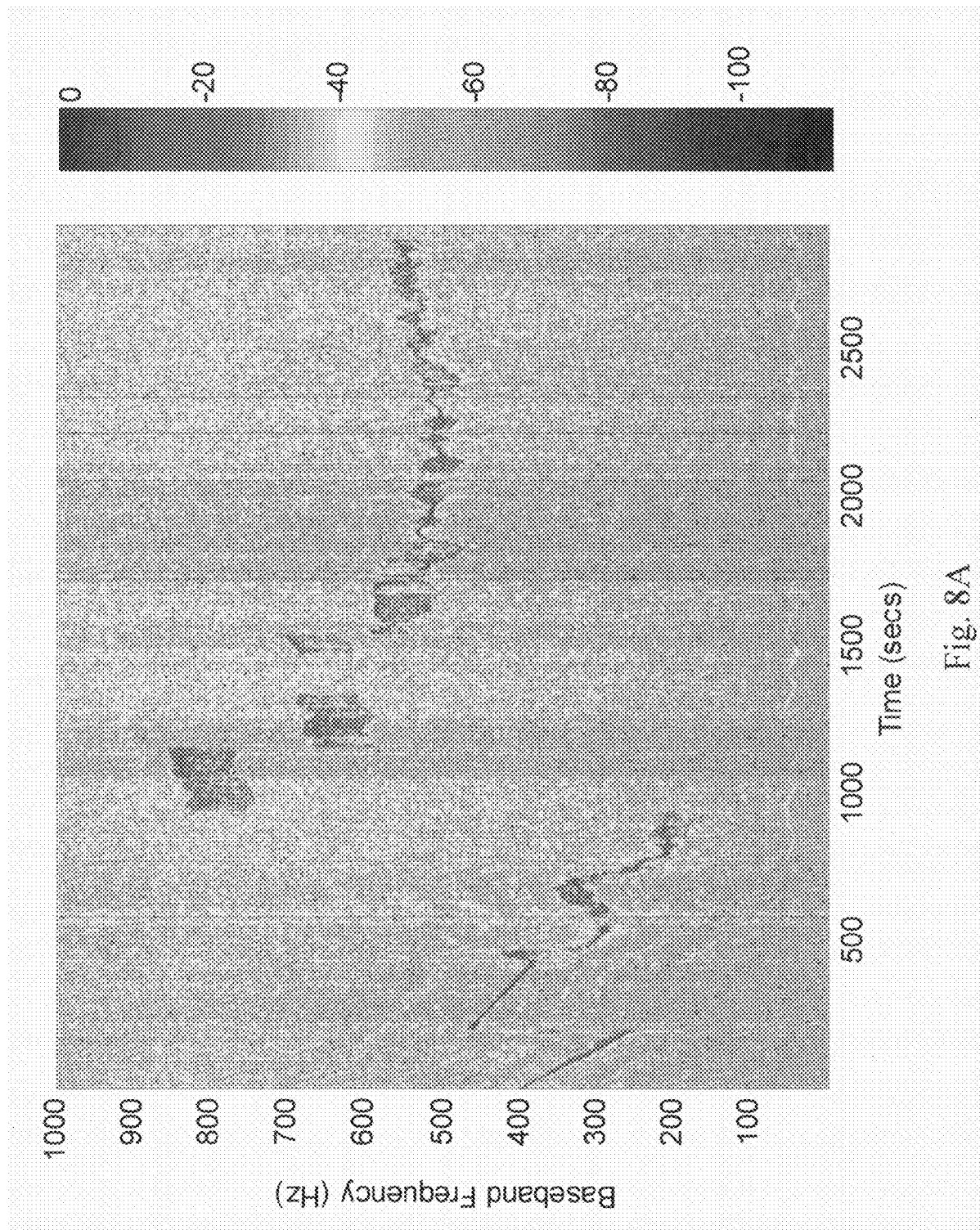

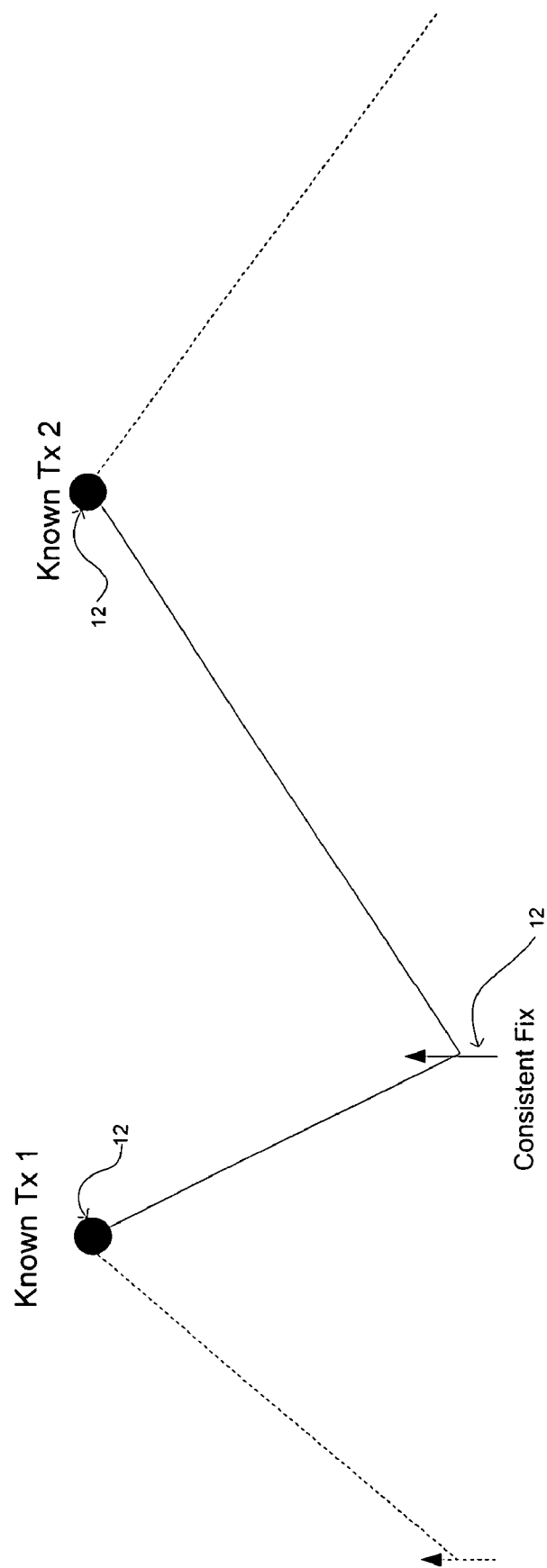

DIRECTION FINDING AND MAPPING IN MULTIPATH ENVIRONMENTS

CROSS REFERENCES TO RELATED APPLICATIONS

Field of the Invention

The present invention relates to the location of stationary and mobile transmitters by direction finding from mobile vehicles and, in particular, in a multipath environment.

BACKGROUND OF THE INVENTION

There are many circumstances wherein it is necessary or desirable to determine the geographic location of an emitter of electromagnetic radiation, such as a radar system, a communications facility or device or an emergency beacon or transmitter. Typical applications may include, for example, military signal intelligence (SIGINT) and electronic intelligence (ELINT) operations for locating radar or communications facilities, and air, land and sea rescue operations wherein it is necessary to locate an emergency beacon or transmitter, such as used in aircraft and vessels, or communications devices ranging from conventional or emergency radio devices to cell phones.

Such applications and operations are characterized by common requirements that are, in turn, imposed by general, common characteristics of the target emitters to be located and the situations or circumstances under which the target emitters are to be located. For example, the signal transmitted by a target emitter may be of relatively low power, as in the case of emergency beacons or emergency radios, or may be masked, distorted or effectively reduced by terrain or weather conditions, and such conditions may be intentionally imposed in, for example, military or otherwise hostile situations. In addition, the time available or permissible for locating a target emitter may be limited in both military and civil situations, that is, and for example, in military counter-measures operations or in search and rescue operations, and the resources available for target emitter location may be limited.

As such, it is generally necessary or desirable for a system for locating target emitters to be mobile, that is, to be readily transportable into the general geographical location of a target emitter on an aircraft, vehicle or vessel, both to bring the locator system into range of the target emitter and to allow the locator system to search as large an area as possible in the minimum time. It is also desirable that a locator system be transported and employed in and from a single platform, whether an aircraft, vessel or vehicle, as the use of a single platform reduces the system cost, reduces demand on frequently limited resources and allows a greater area or number of areas to be searched when multiple platforms are available. A single platform system also eliminates the complexity and time delays inherent in deploying and coordinating multiple cooperatively operating platforms.

The locator system must be capable of identifying the geographic location of a target emitter with the greatest possible accuracy as insufficient accuracy in locating a target emitter may render counter-measures ineffective in military situations and may unacceptably delay locating or reaching the target emitter in civil situations, such as search and rescue operations, particularly in difficult terrain or weather conditions. In addition, the locator system should be capable of locating as wide a range of target emitter types as possible, and correspondingly over as wide a range of the electromagnetic spectrum as possible, to allow a given locator system to be employed in as wide a range of applications and situations as possible.

There are a number of factors that determine and limit the characteristics and capabilities of an emitter location system, and in particular a single platform, mobile emitter location system, are numerous and inter-related. For example, current methods for single platform emitter location are based upon determining multiple direction finding (DF) bearings, often referred to as DF "cuts", to the target emitter at points along a path traversed by the locator platform, such as the flight path of an aircraft. Each "cut" is an attempt to determine the direction of the emitter relative to the locator platform at the point the "cut" is taken by using an amplitude or phase detecting directional antenna and receiver array to determine the direction of the strongest signal component or the phase gradient, that is, the direction of propagation, of the wavefront of the received signal. Successive DF cuts may be used to determine a Line of Bearing (LOB) "fan" of DF cuts, with the location of the target emitter being taken as the point of intersection of the DF bearings forming the LOB fan.

These method of the prior art are, however, subject to significant limitations and problems. For example, signal propagation factors between the emitter and the locator system path at various points, such as variations in propagation conditions, local multipath distortions, multiple propagation paths and reflections, will result in significant errors in the measured gradients of the wavefront and this significant errors in the measured bearings between the locator system and the target emitter.

One of if not the most significant problem in the direction finding methods of the prior art is that of multipathing, that is, the tendency for a received signal to appear to arrive from multiple sources separated from the true source. This phenomenon is well known to communications engineers, as evidenced, for example, by R. H. Clarke: "A Statistical Theory for Mobile Radio Communications," Bell System Technical Journal, July 1968, 47, pp. 957-1000).

In brief, multipath sources typically appear to surround the receiving unit and to have effectively random radiation patterns and arise from the reflection or refraction of the transmitted signal by "scatterers", which may be any element of the environment capable of reflecting the original signal or of refracting the original signal around themselves.

Conventional direction finding systems typically employ two or more receiving antennas spaced apart from one another along a "baseline" and compare the amplitudes or phases of the signals received at the antennas to determine the direction to the transmitter. This method is, however, historically subject to systemic errors for a number of reasons. For example, if the antennas are spaced too closely there will be correlation between the multipath components of the received signal, and between the multipath components and the direct arrival component, resulting in an induced multipath bias error that cannot be "washed out" even by time integration of the received signal components. If, however, the antennas are spaced too far apart, such as more than one wavelength apart, the multipath and direct arrival components will be decorrelated, but there will be phase ambiguity in the received signals because the received direct arrival component, for example, will contain more than one wavelength.

SUMMARY OF THE INVENTION

The present invention is directed to a method for determining a direction of a direct arrival path between a receiver and a transmitter in a multipath environment by determining a transmitter heading relative to the receiver as proportional to a frequency offset of the direct path signal component relative to a multipath pedestal, an absolute velocity of the transmitter as proportional to a width of the multipath pedestal, a relative velocity between the transmitter and the receiver as proportional to a magnitude and a direction of doppler shift of the direct arrival component of the received signal relative to the doppler pedestal, and an amplitude of the multipath pedestal as proportional to a number and magnitude of scatterers in the multipath environment.

The method is applied for continuous wave and modulated signals, for stationary and moving transmitters, for tracking and mapping transmitter paths, and for navigational purposes for locating a position of a receiver.

DESCRIPTION OF THE DRAWINGS

The above discussed aspects of the prior art and the following discussed aspects of the present invention are illustrated in the figures, wherein:

FIGS. 8A and 8B illustrate the a received signal in a multipath environment with relative motion between the transmitter and receiver;

DESCRIPTION OF THE INVENTION

Figure 1A:
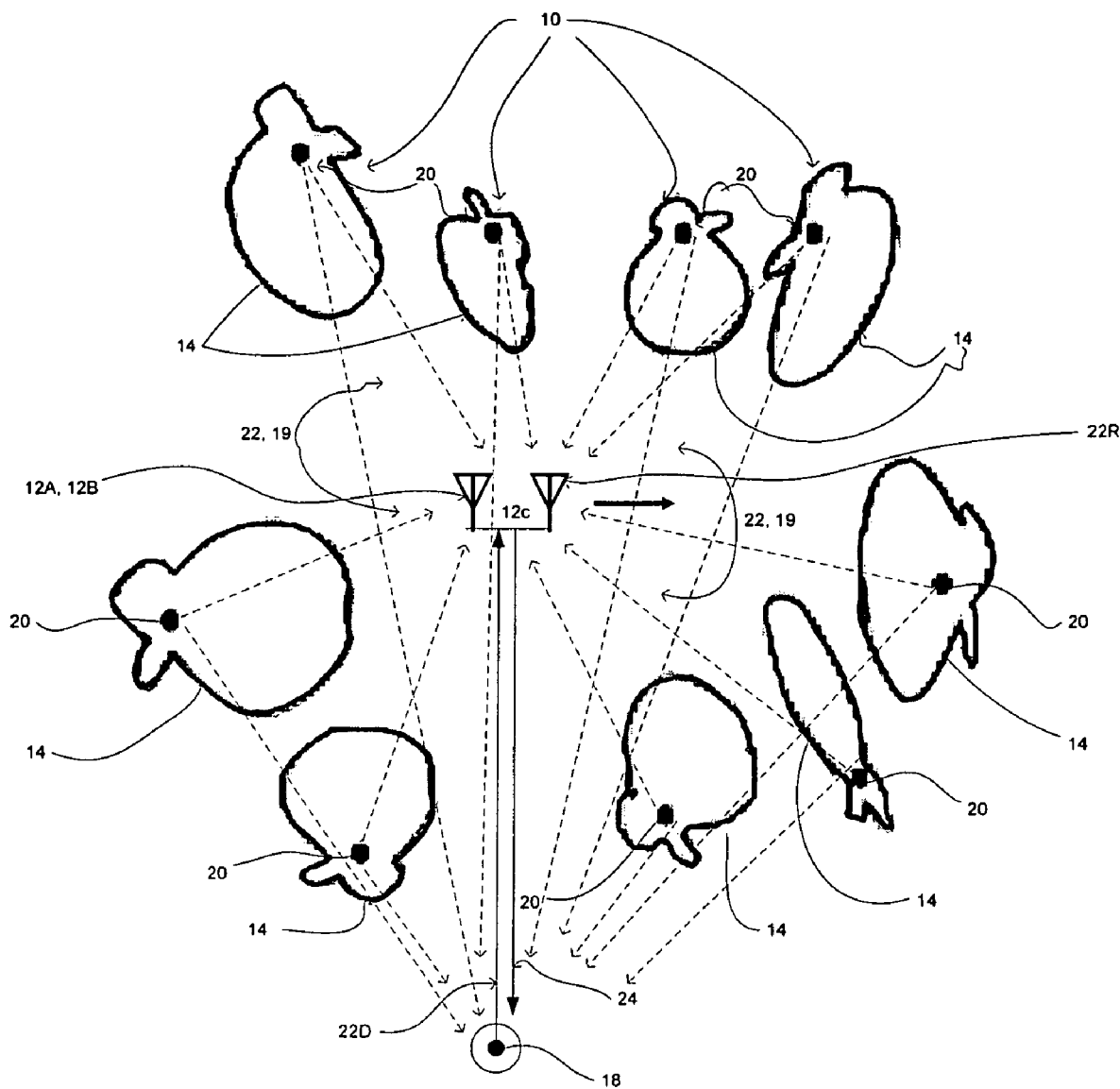
FIG. 1A illustrates the effect of scatters and the creation of a Doppler pedestal of received components by scatterers.

First considering multipath and the problems arising from multipath as illustrated diagrammatically in FIG. 1A, multipath sources 10 typically appear to surround the receiving unit 12 and to have effectively random radiation patterns 14 and arise from the reflection or refraction of a transmitted signal 16 from a transmitter 18 by "scatterers" 20, which may be any element of the environment capable of reflecting the original signal or of refracting the original signal around themselves.

As illustrated in FIG. 1A, conventional direction finding systems typically employ two or more DF (direction finding) receiving antennas 12A and 12B spaced apart from one another along a "baseline" 12C and compare the amplitudes or phases of the signals received at the DF antennas 12A and 12B to determine the direction to the transmitter 18. This method is, however, historically subject to systemic errors for a number of reasons. For example, if the DF antennas 12A and 12B are spaced too closely there will be correlation between the multipath components 22M of the received signal 22R, and between the multipath components 22M and the direct arrival component 22D, resulting in an induced multipath bias error that cannot be "washed out" even by time integration of the received signal components. If, however, the DF antennas 12A and 12B are spaced too far apart, such as more than one wavelength apart, the multipath components 22M and direct arrival components 22D will be decorrelated, but there will be phase ambiguity in the received signals because the received direct arrival component 22D, for example, will contain more than one wavelength.

According to the present invention, and according to the measurement configurations and processing algorithms of the present invention, the accuracy of identifying a true direction line 26 to a transmitting source can be significantly improved when there is relative motion between the transmitter 18 and the receiver 12, or between either the transmitter 18 or receiver 12 and the scatterers 22.

Figure 1B:
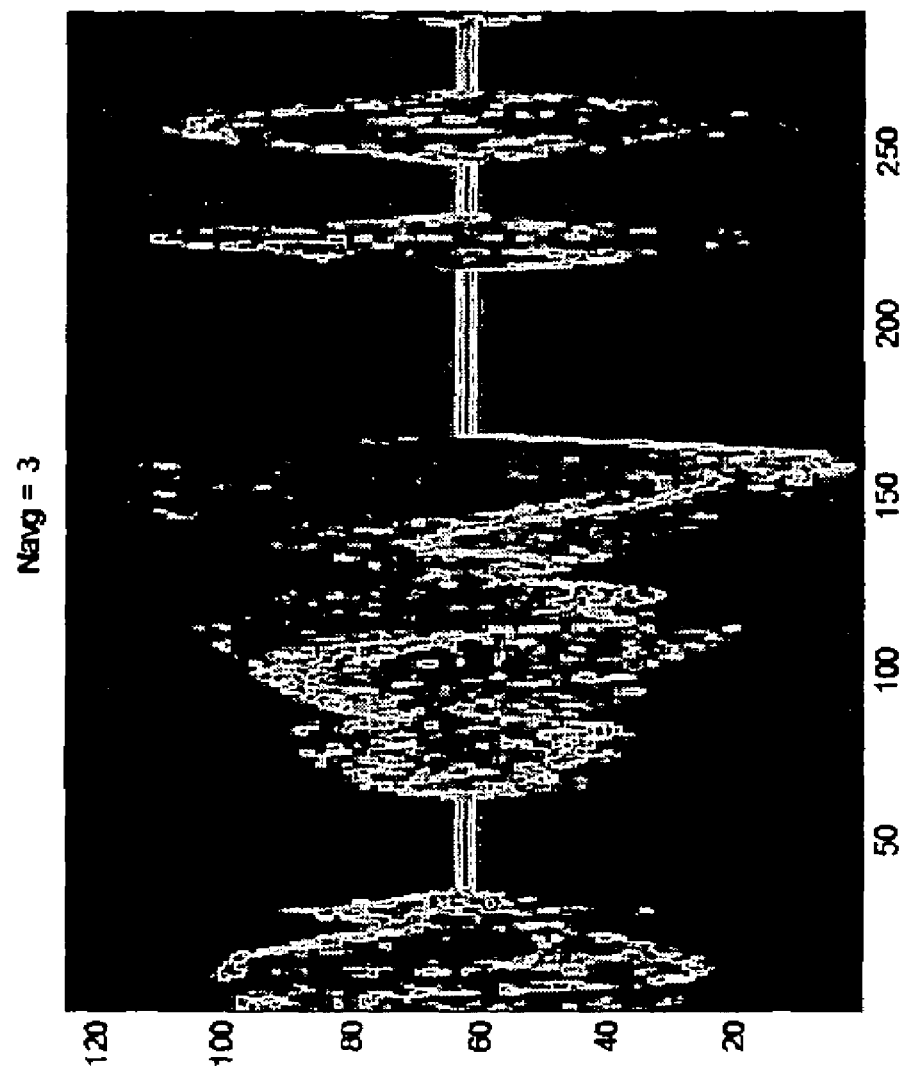
FIGS. 1B and 1C illustrate the creation of a doppler pedestal in a received signal in a multipath environment when the transmitter and receiver are in relative motion.
Figure 1C:
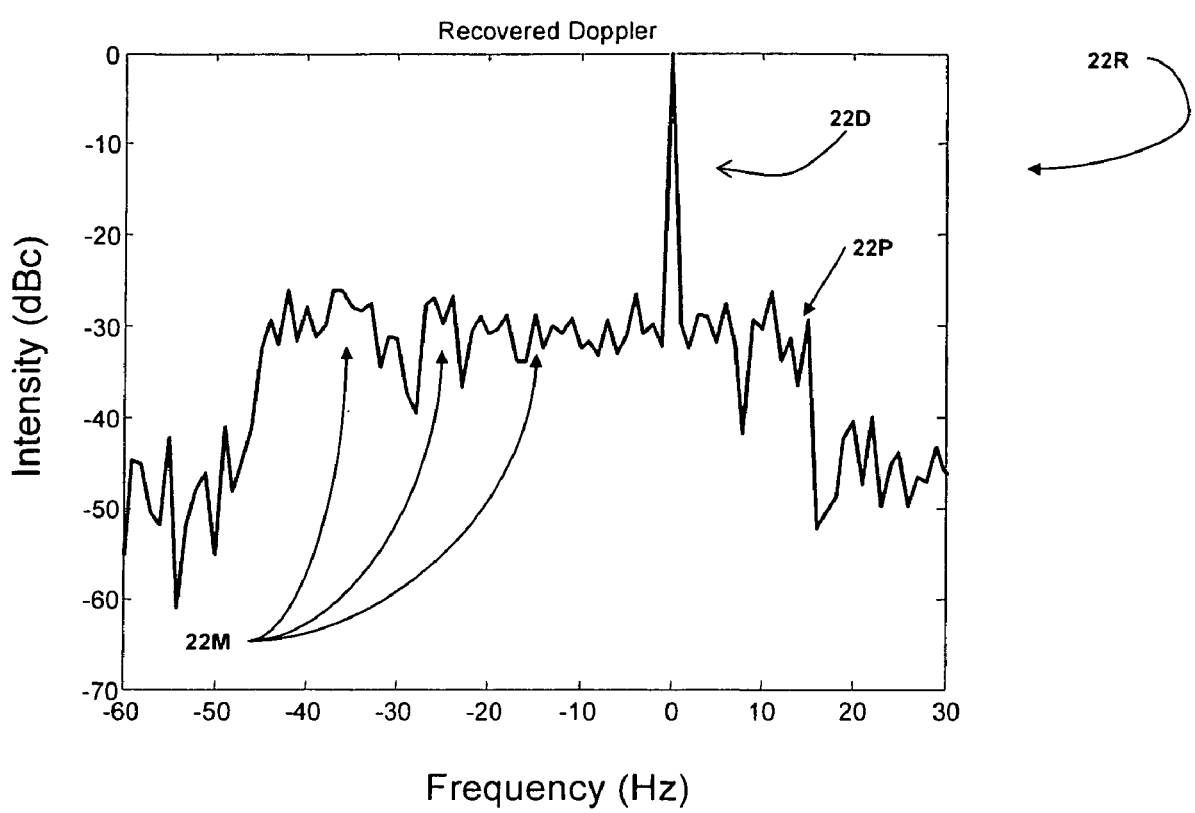

When there is motion of the transmitter 18 or the receiver 12 or both, or between either or both and the scatterers 20, the received signal 22R is comprised of a direct arrival component 22D, that is, a component arriving along a direct path from the transmitter to the receiver, and a plurality of multipath components 22M arriving at the receiver 12 from the scatters along reflective and refractive paths. The received direct arrival component 22D will have a Doppler shift that is determined by the relative speed and heading of the transmitter 18 and the receiver 12 while the multipath components 22M will have a range of Doppler shifts with the Doppler shift of each multipath component 22M being determined by the path followed between the transmitter 18 and the receiver 12. In summary, therefore, and as illustrated in FIGS. 1B and 1C, the received signal 22R will thereby be comprised of the direct arrival component 22D having a Doppler shift determined by the relative speed and heading of the transmitter 18 and receiver 12 accompanied by, or surrounded by, a Doppler "pedestal" 22P comprised of a plurality of multipath signals 22M. The width of pedestal 22P is twice the sum of the receiver and transmitter absolute (not relative) speeds divided by the wavelength of the signal of interest.

As may be seen from FIGS. 1B and 1C, the power or amplitude of the multipath components 22M are thereby diluted by the Doppler spreading of the multipath components 22M while the power or amplitude of the direct component 22D is not diluted because the direct arrival component follows the direct path. The Doppler dilution of the amplitude or power of the multipath components 22M relative to the direct arrival component 22D thereby effectively provides a processing gain that can improve the accuracy of the DF result by raising the amplitude of the direct arrival component 22D above that of the multipath components 22M. It must be noted, however, that the method of the present invention requires relative motion of the transmitter 18 or the receiver 12 or both, or between either or both and the scatterers 20, because when there is no motion of either the transmitter or the receiver there is no "spreading" or "dilution" of the multipath components 22M and the multipath pedestal 22P collapses on top of the direct arrival component 22D, so that the processing advantage is lost.

Figure 2:
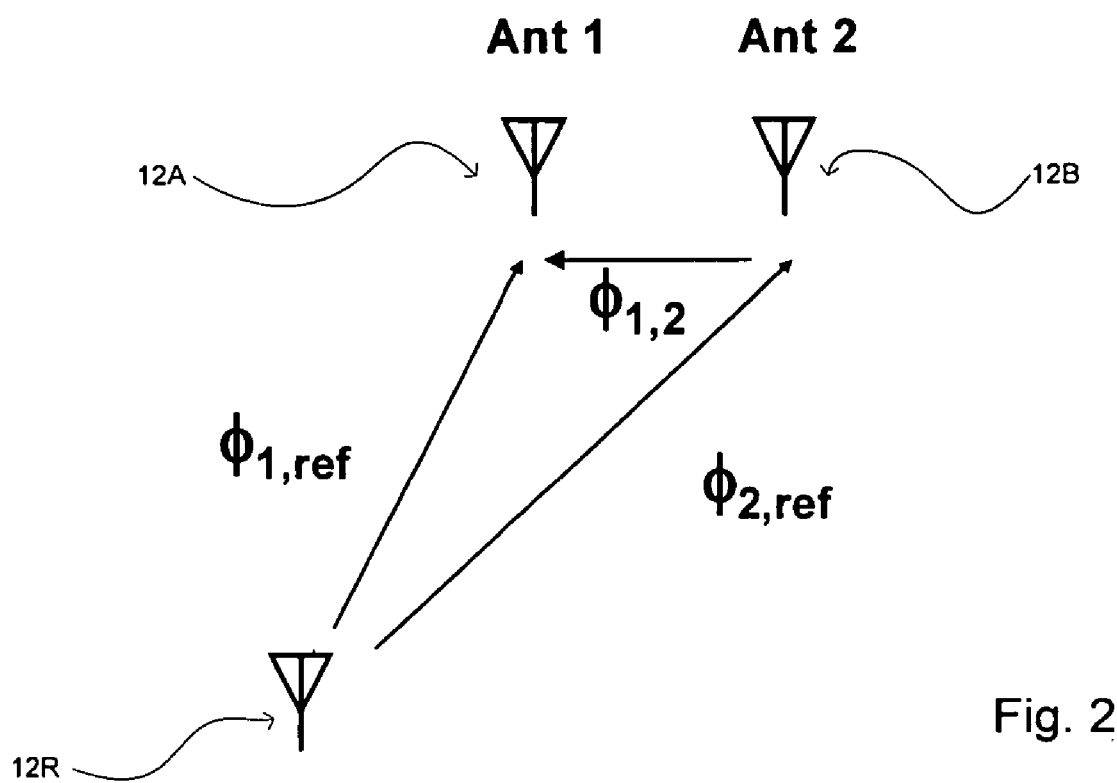
FIG. 2 is an illustration of a direction finding array according to the present invention.

A. Direction Finding for a Stationary Transmitter in a Multipath Environment First considering implementations of the present invention for those cases wherein the transmitter 18 is stationary, and according to the present invention as illustrated in FIG. 2, the method and apparatus of the present invention employs a moving array of two or more relatively closely spaced DF antennas 12A and 12B and a more distantly spaced reference antenna 12R. For example, DF antennas 12A and 12B are spaced sufficiently close to eliminate phase ambiguity at the highest frequency of interest, recognizing that the multipath signal components 22M received by DF antennas 12A and 12B will most probably by correlated in the frequency ranges of interest.

Reference antenna 12R, however, is spaced apart from DF antennas 12A and 12B by a distance sufficient that, at the frequencies of interest, the multipath components 22M received by reference antenna 12R are decorrelated with respect to the direct arrival signal components 22D received by correlated antennas 12A and 12B. In this regard, it must be recognized that there will most probably be phase ambiguity between the signal components 22D and 22M received by reference 12R antenna with respect to the signal components 22D and 22M received by DF antennas 12A and 12B in the frequency range of interest.

Figure 3:
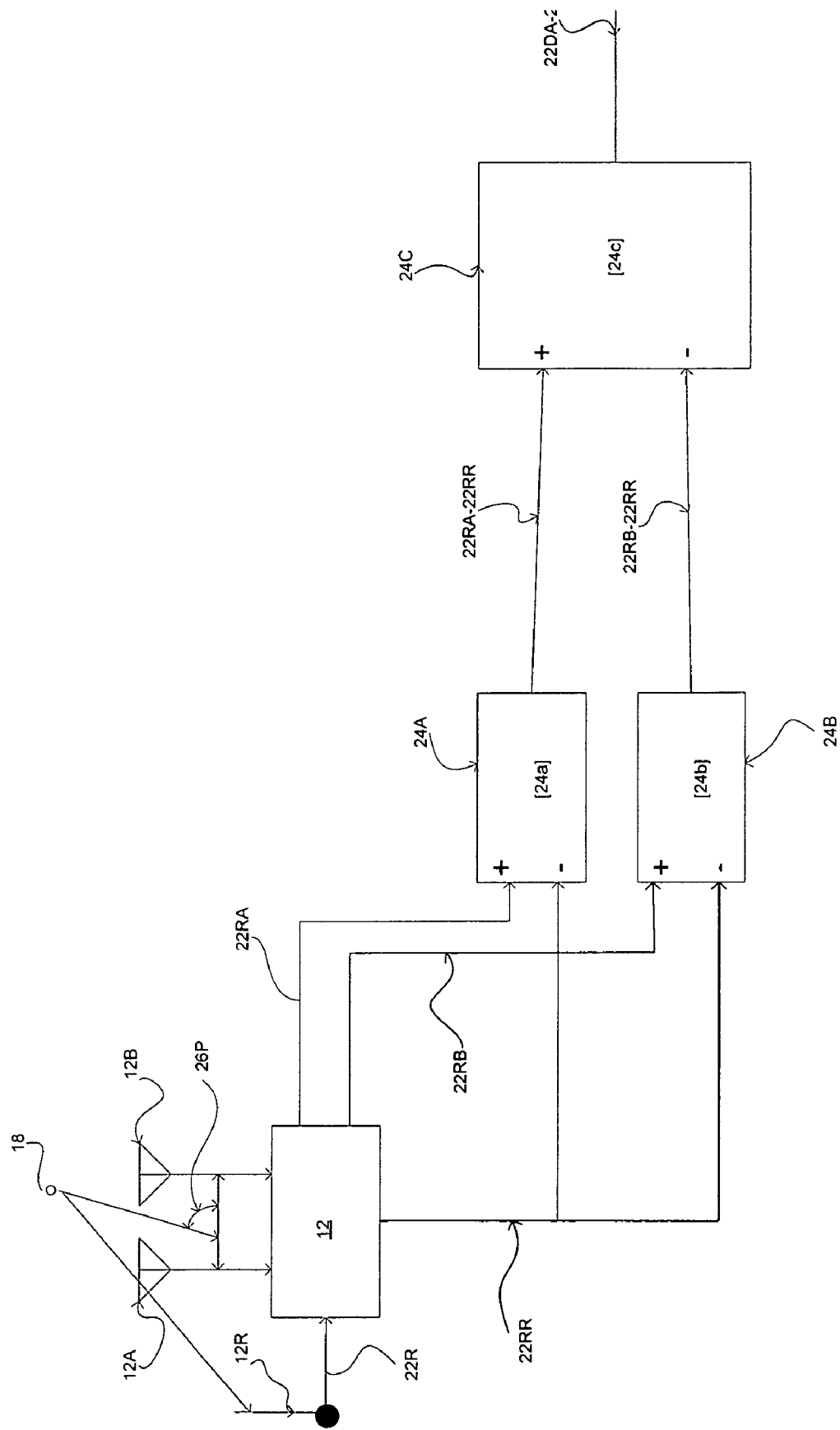
FIG. 3 is a diagrammatic illustration of a direction finding system of the present invention.

The method and apparatus for determining the desired direction finding baseline according to the present invention is illustrated in FIG. 3. As illustrated therein, DF antennas 12A and 12B are sufficiently close to eliminate phase ambiguity at the highest frequency of interest and reference antenna 12R is spaced apart from DF antennas 12A and 12B by a distance sufficient that, at the frequencies of interest, the multipath components 22M received by reference antenna 12R are decorrelated with respect to the direct arrival signal components 22D received by correlated antennas 12A and 12B. It will be understood that the corresponding receiver or receivers, indicated as single shared receiver 12, may be implemented as separate receivers for the three antennas, as one receiver for DF antennas 12A and 12B and a second receiver for reference antenna 12R, or, as shown, as a single receiver shared among the three antennas.

In a [step 24A], performed by a comparator 12a, the direct and multipath received signal components 22DR and 22MR of received signal 22RR at reference antenna 12R, are compared in phase with, that is, subtracted from, the direct and multipath received signal components 22DA and 22MA of received signal 22RA at receiving antenna 12A, giving the result 22RA-22RR, or (22DA+22MA)-(22RD+22RM). At the same time, in step [24B], performed by a comparator 12b, the received signal components 22DR and 22MR of received signal 22RR at reference antenna 12R are compared in phase with, that is, subtracted from, the received signal components 22DB and 22MB of received signal 22RB at DF antenna 12B, giving the result 22RB-22RR, or (22DB+22MB)-(22DR+22MR). Then, in a step [24C], the comparison between DF antenna 12A and reference antenna 12R and the comparison between DF antenna 12B and reference antenna 12R from steps 24A and 24B are then differenced, that is, subtracted, in a step 24C performed by a comparator 24c to give the result 22DA-22DB, or [(22DA+22MA)-(22RD+22RM)]-[(22DB+22MB)-(22DR+22MR)], which yields baseline phase angle measurement 26P indicating the direct line 26 to the transmitting source 18.

Figure 4:
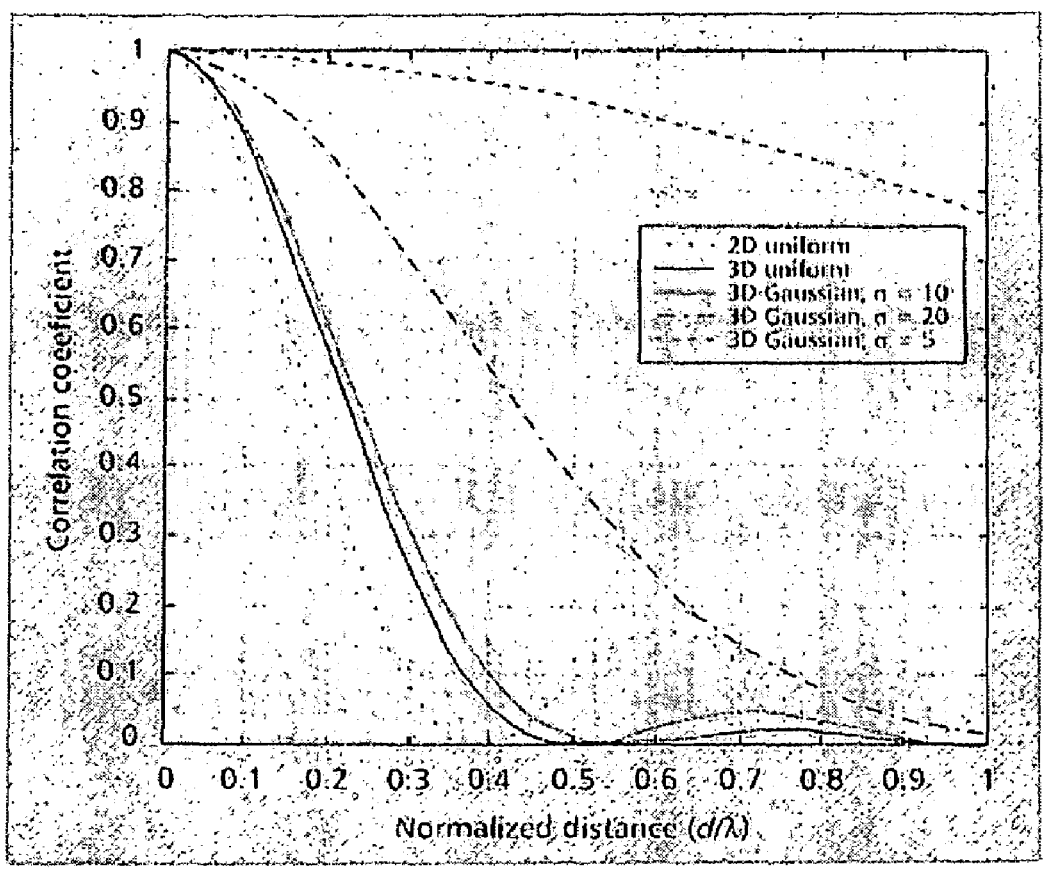
FIG. 4 illustrate the effects of antenna spacing dependent correlation and decorrelation on the pedestal spectrum of received multipath signals.

It will therefore be seen that the reference antenna 12R received signal components 22DR and 22MR are common to the two comparisons so that the phases of the reference antenna 12R received signal components 22DR and 22MR will cancel out. In addition, and because the reference antenna 12R received signal components are decorrelated with received signal components 22DA and 22MA at DF antenna 12A and with respect to received signal components and 22MB at DF antenna 12B, the multipath signal components 22M will "wash out", as illustrated in FIG. 4. The comparisons and differencing will thereby provide, as a result, the desired direction finding baseline phase angle measurement 26P indicating the direct line 26 to the transmitting source 18.

Figure 5:
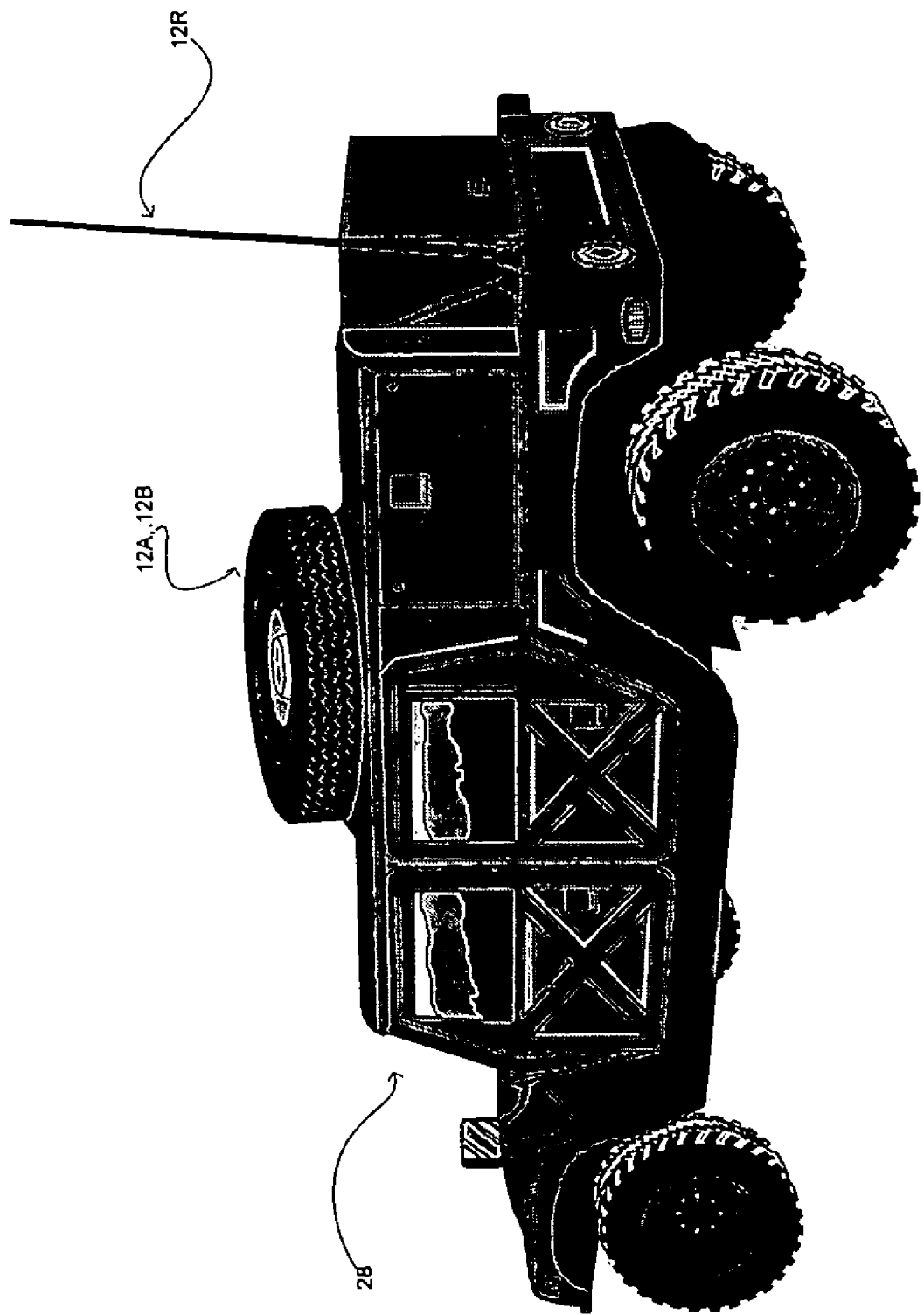
FIG. 5 is an illustration of a mobile direction finding system of the present invention.

Referring to FIG. 5, therein is illustrated an exemplary embodiment of the correlated DF antennas 12A and 12B and reference antenna 12R of the present invention wherein the three antennas are mounted onto a ground mobile vehicle 28. As indicated, the two correlated DF antennas 12A and 12B comprise a direction finding array, that may be concealed or disguised, and reference antenna 12R may appear as no more than a conventional whip antenna.

Other factors that should be noted in implementing the invention include, for example, the ability to repeatedly scan a given frequency band in order to detect newly appearing transmitters. In this regard, it should be noted that the frequency band to be scanned may include a relatively wide frequency band of interest, and, even in the case of a relatively narrow frequency band, will normally include the anticipated frequency width of the Doppler pedestal. In such instances, the frequency band of interest is preferably scanned at least the Nyquist rate for the pedestal width in order to avoid fold over (aliasing) of the multipath energy.

Also, the presence or absence of a direct arrival component can be detected by determining whether there is a strong spectral line, that is, a strong direct signal component 22D, protruding from the Doppler pedestal 22P. This can be used to reject futher processing of any signals not in direct line of sight of the receiver by amplitude discrimination. In addition, and when all of the receiving antennas move as a integral unit, such as when all of the receiving antennas are mounted on the same vehicle, the direct arrival component maps to the "DC" component of the pedestal, that is, the stable mid-band component of the received signal pedestal, and the angle of this DC component is the desired phase measurement. It should also be recognized that the intensity of the multipath can be determined by summing the power in the other, that is, non-direct arrival, bins of the Doppler pedestal, which will represent the total multipath component power, and comparing the total multipath component power to the DC level. According to Parseval's theorem, this measurement can be made in the time domain without having to actually compute the Doppler spectrum.

B. Direction Finding for a Moving Transmitter in a Multipath Environment

Figure 6:
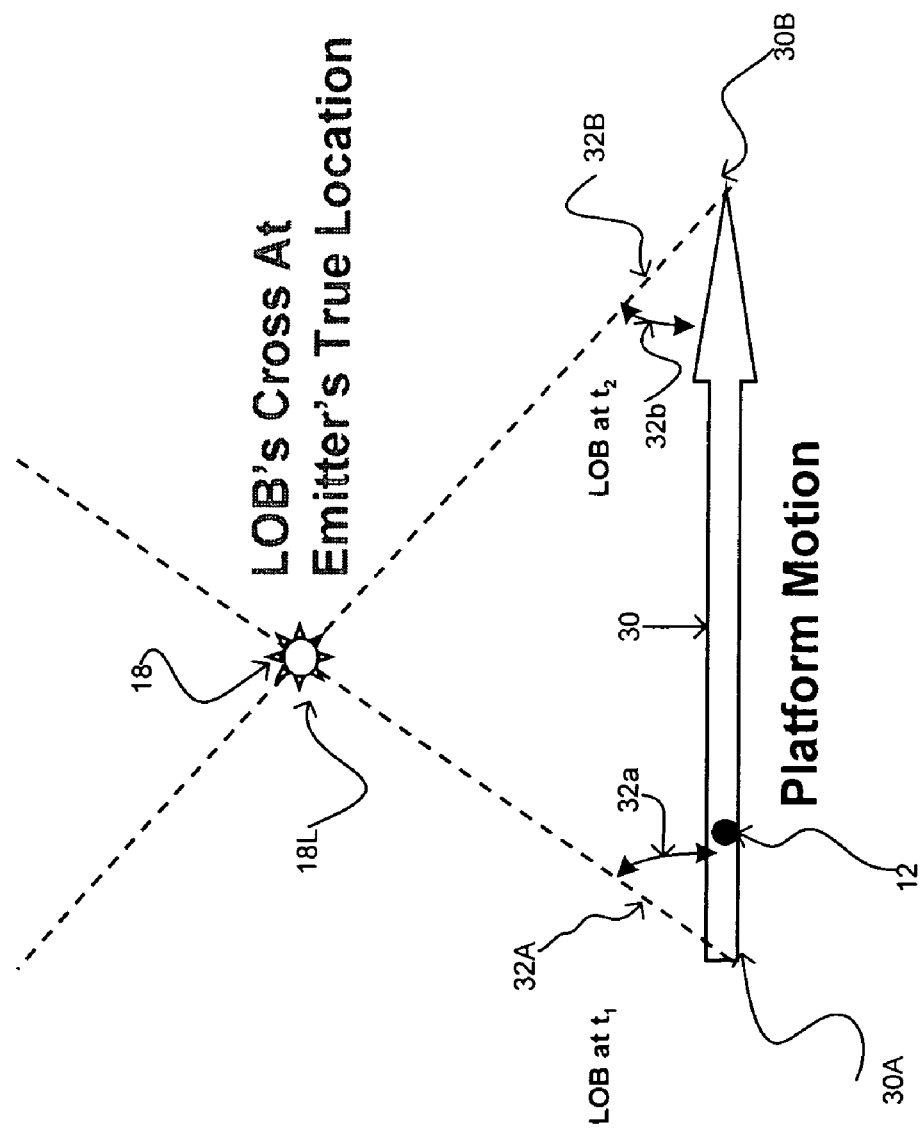
FIG. 6 is an illustration of direction finding and transmitter location when the receiver is in motion.

Next considering the case of a moving transmitter 18 in a multipath environment, FIG. 6 illustrates direction finding for the above described method of the present invention when the transmitter 18 is stationary. In that case, as discussed above, receiver 12 traverses a path 30 relative to a transmitter 18 that is in a fixed location 18L and determines the bearing angles 32a and 32b of direction transmission paths 32A and 32B to the transmitter 18 relative to path 30 from points 30A and 30B of the path 30 and the location of the intersection of direct transmission paths 32A and 32B at location 18L identifies the location of the transmitter 18.

Figure 7B:
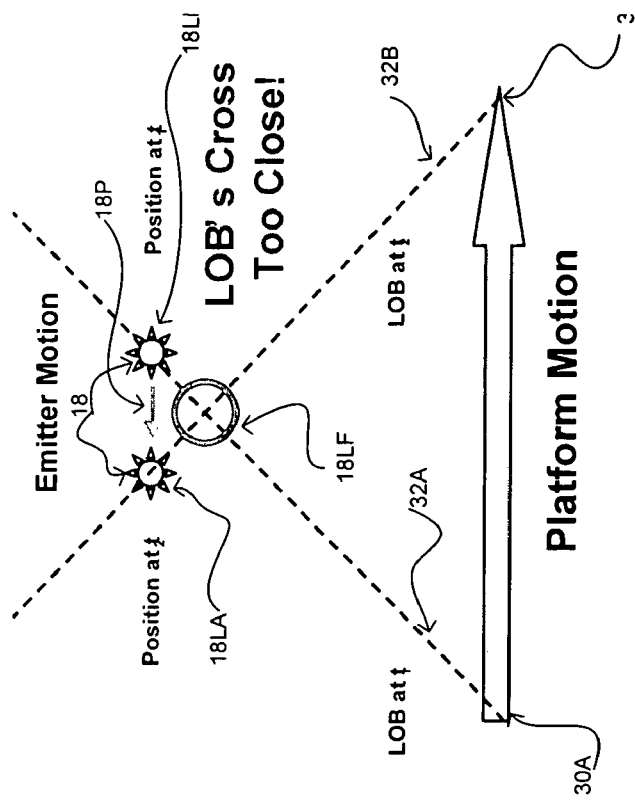
FIGS. 7A, 7B and 7C are illustrative diagrams of direction finding and transmitter location when the receiver and transmitter are in relative motion.
Figure 7A:
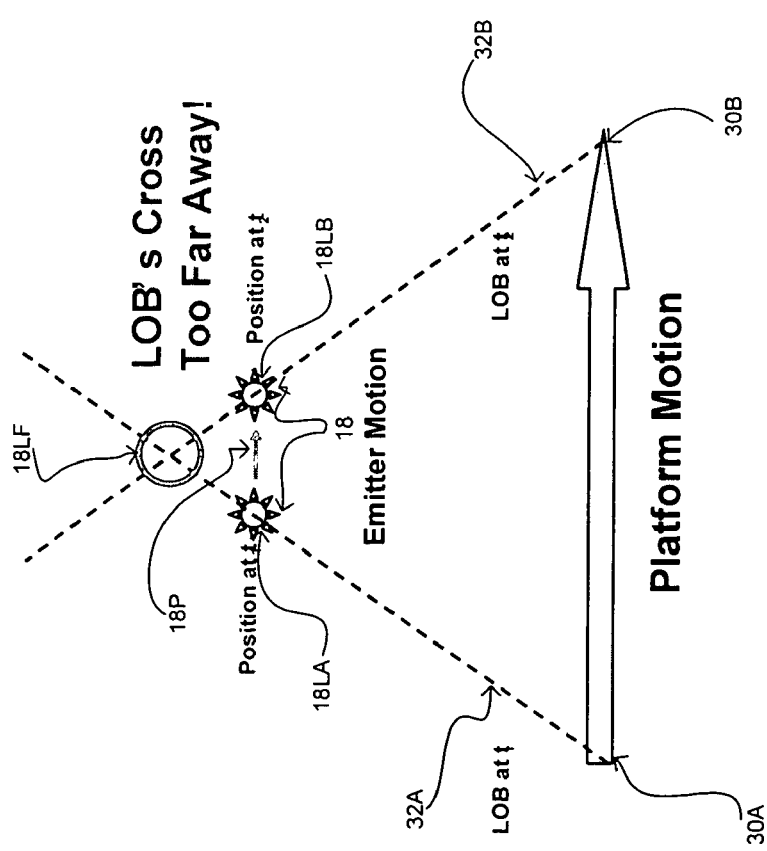

Therefore considering the case when transmitter 18 is in motion along a transmitter path 18P, FIG. 7A illustrates the case when transmitter 18 is moving along a transmitter path 18P that extends in the same general direction as receiver path 30. When the direct transmission path 32A is determined at point 30A of path 30, transmitter 18 is at a first location 18LA along path 18P and, when the direct transmission path 32B is determined at point 30B along path 18P, transmitter 18 has moved to a location 18LB along path 18P. As a result, and although the direction angles of direction transmission paths 18LA and 18LB relative to the locations of receiver 12 are correct at each of points 30A and 30B, the motion of transmitter 18 along path 18P will result in the apparent intersection of the direction transmission path vectors 32A and 32B at a false intersection point 18LF rather than at either of locations 18LA or 18LB. As shown in the case of a transmitter 18 moving in the same general direction as the receiver 12, the false intersection point 18LF will lie on both direct transmission path vectors 32A and 32B, but point 18LF will be offset with respect to path 18P in the direction away from receiver 12. The same type of error will result in the case when transmitter 18 is moving in a direction opposite to the receiver 12, but as illustrated in FIG. 7B the error will be in the opposite direction; that is, the transmitter 18 will appear to be closer to receiver 12.

Figure 7C:
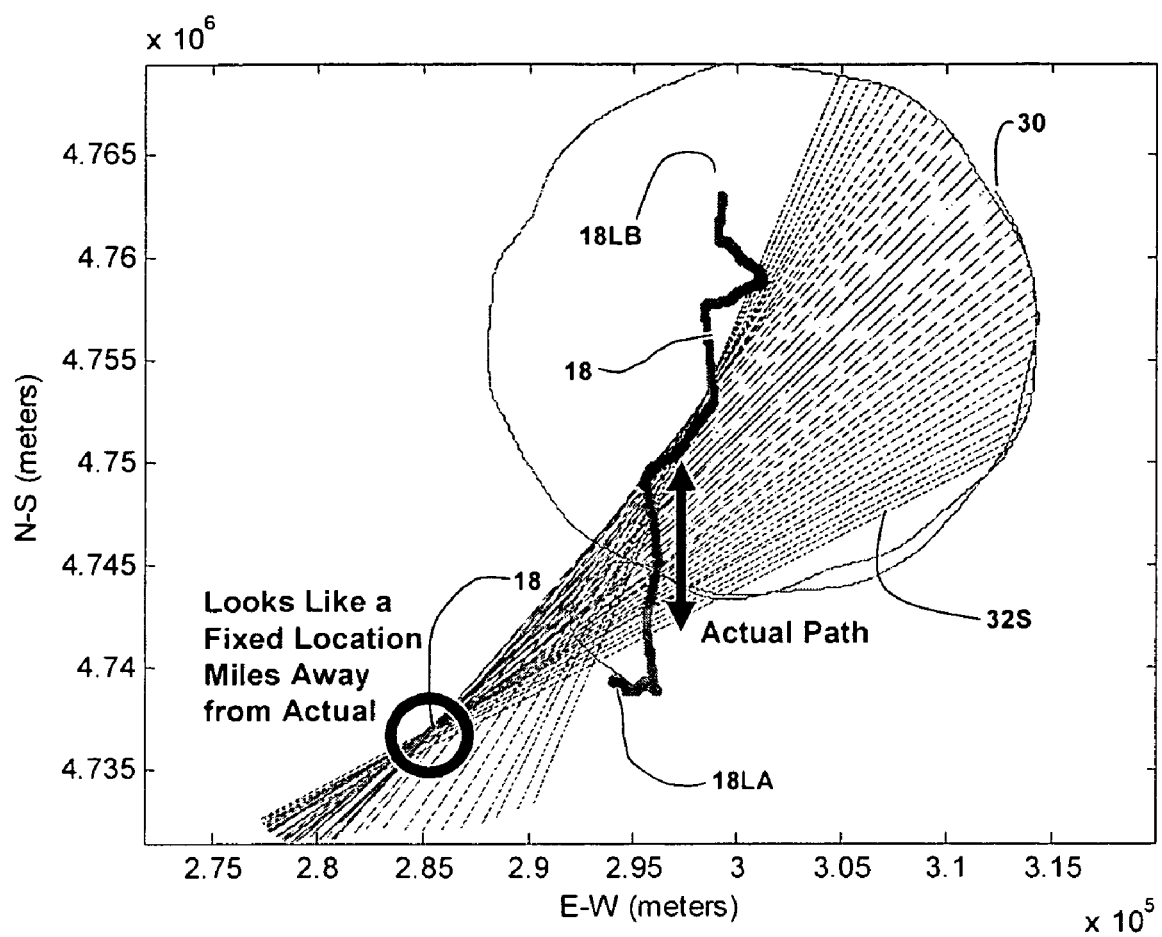

This problem is further illustrated in FIG. 7C for an experiment wherein transmitter 18 was mounted on a vehicle and transmitted a CW signal at 100 mw at a frequency of 432.075 MHz from a ⅝th magnetic mount vertical rod antenna on the roof of the vehicle while the vehicle traveled a path 18P from a first location in Nashua, N.H. to a second location n Manchester, N.H. The receiver 12 was mounted on an aircraft that flew a path 30 enclosing a major part but not all of the vehicle path 18P. As shown, the resulting "sheaf" 32S of direction finding bearings indicated that the transmitter 18 was at a false location 18LF that appeared to be fixed and that was not only many miles from the path 18P, but was not even at any point along the path 18P.

Figure 8B:
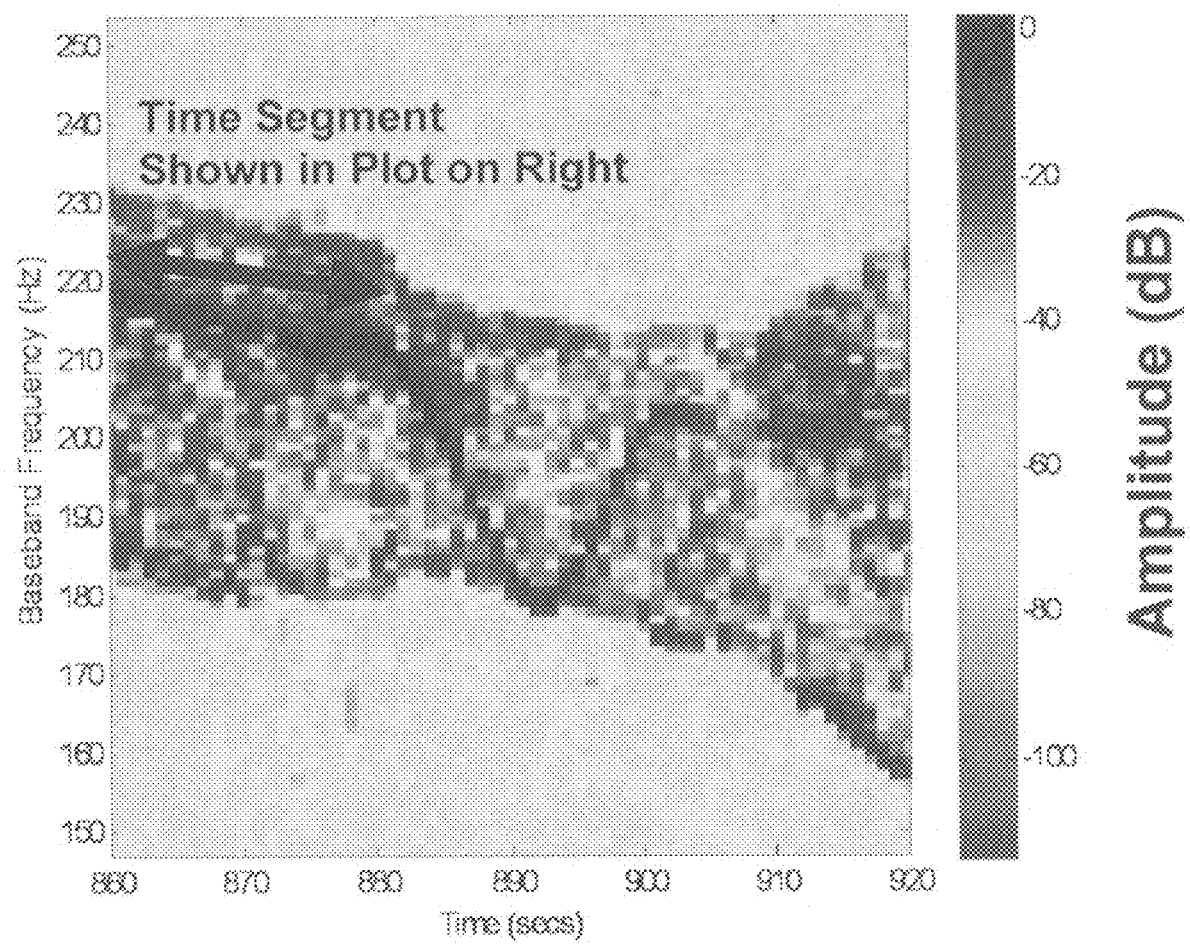

1. Direction Finding and Path Mapping for a Moving Transmitter in a Multipath Environment, Continuous Wave (CW) Signal First considering the case of a continuous wave (CW) signal emitted by a moving transmitter, and continuing with the results obtained from the above described experiment, FIG. 8A illustrates data recorded during the experiment and is a frequency/time plot/signal amplitude plot of the received signal during a portion of the experiment. As may be readily seen from FIG. 8A, the multipath pedestal 22P resulting from motion of the transmitter 18 and the receiver 12 is present throughout the entire period during which the transmitter 18 or the receiver 12, or both, are in motion. FIG. 8B, in turn, is a time/bandwidth/signal amplitude plot of the processed data and illustrates that both the multipath pedestal 22P and the direct arrival signal component 22D are likewise apparent throughout the period of the experiment, and that at least in this instance the multipath pedestal 22P has an average amplitude approximately −20 dB below that of the direct arrival signal component 22D.

Figure 9:
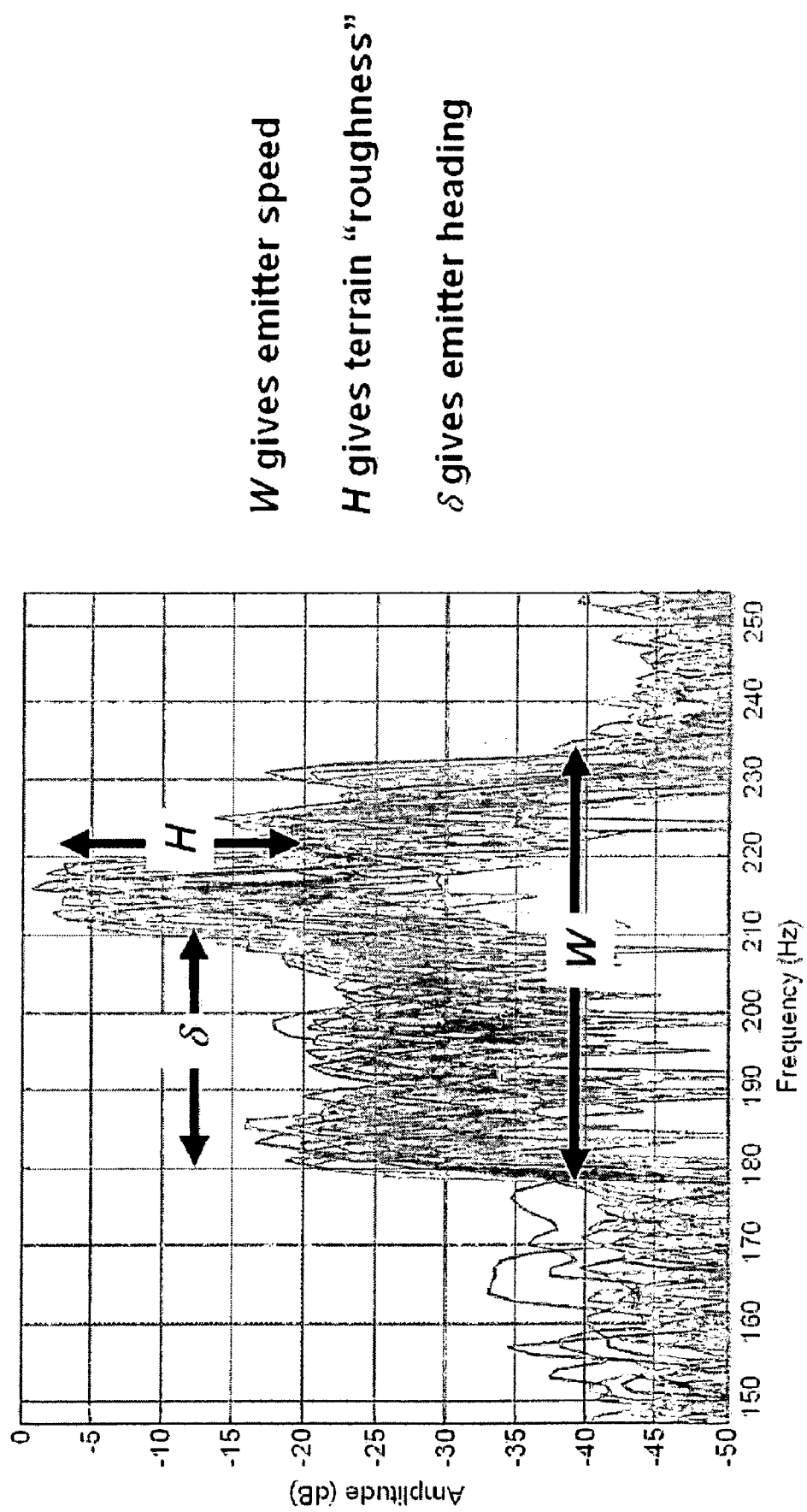
FIG. 9 illustrates the presence of a multipath pedestal and a slewed direct arrival component in a signal received in a multipath environment from a moving transmitter, and the relationship of pedestal width and direct arrival slew to the velocity and relative bearing of the transmitter.

Referring now to FIG. 9, therein is shown an exemplary frequency/amplitude plot of received signal 22R under the above described conditions. As illustrated therein, it has been found that the width W of the multipath pedestal 22P is determined by the absolute velocity of the transmitter 18 and that the height H of the direct arrival signal component 22D is proportional to the "roughness" of the terrain in which the transmitter 18 is located. It has also been found that the frequency offset δ of the direct arrival component 22D within the multipath pedestal 22P, in this case relative to the lower frequency edge of the multipath pedestal 22P, is directly proportional to the transmitter 18 heading relative to the receiver 12. In addition, and as previously discussed, the magnitude and direction of the Doppler shift of the direct arrival component 22D is proportional to the relative velocity between the transmitter 18 and receiver 12 and thereby contains information pertaining, for example, to whether the distance between the transmitter 18 and receiver 12 is increasing or decreasing and the speed with which the distance is increasing or decreasing.

Figure 10:
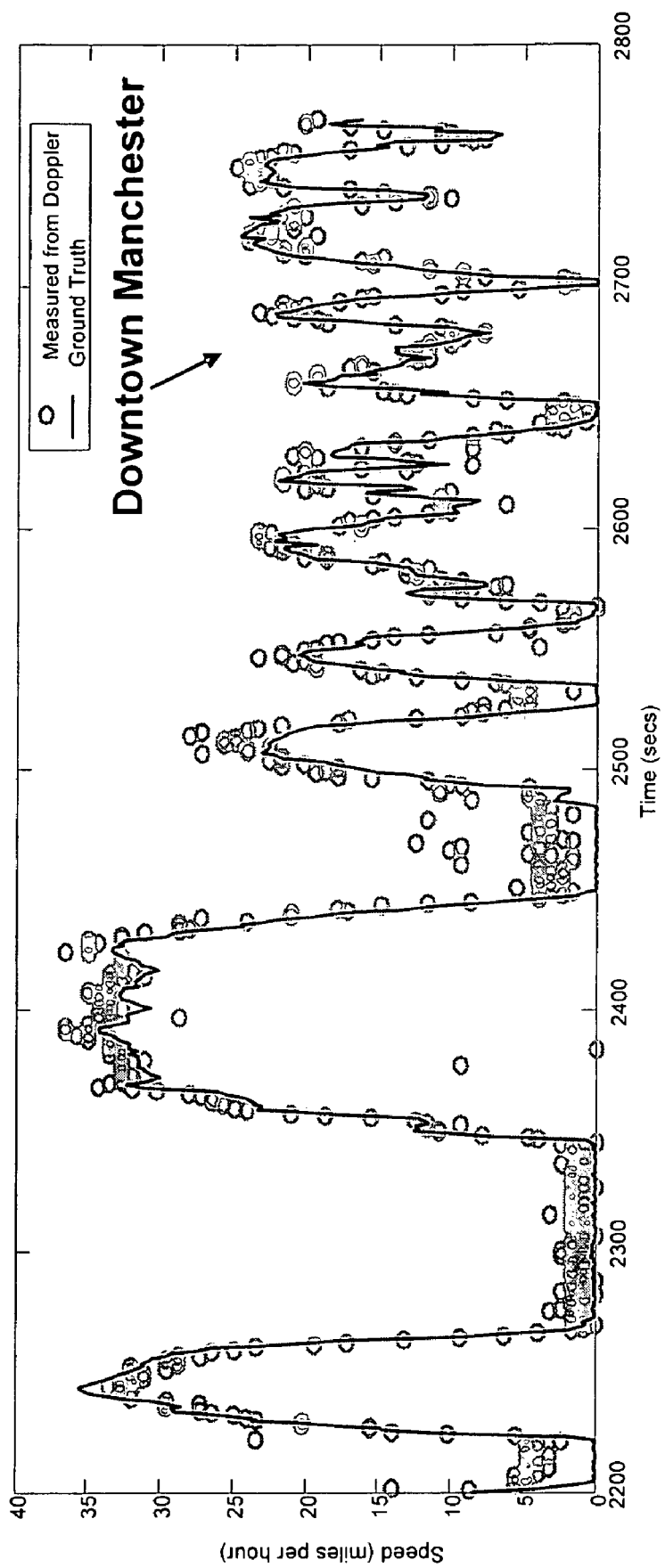
FIG. 10 is an illustration of transmitter velocity versus measured ground speed as obtained from a received signal.

FIG. 10 illustrates the degree of correlation between the physical ground speed and relative heading of the vehicle and the vehicle speed calculated from the Doppler shift/relative bearing information extracted from the received signal 22R for the experiment described above; that is, for a transmitter bearing vehicle traveling from Nashua, N.H. to downtown Manchester, N.H. and a receiving bearing aircraft circling the Manchester area.

Figure 11A:
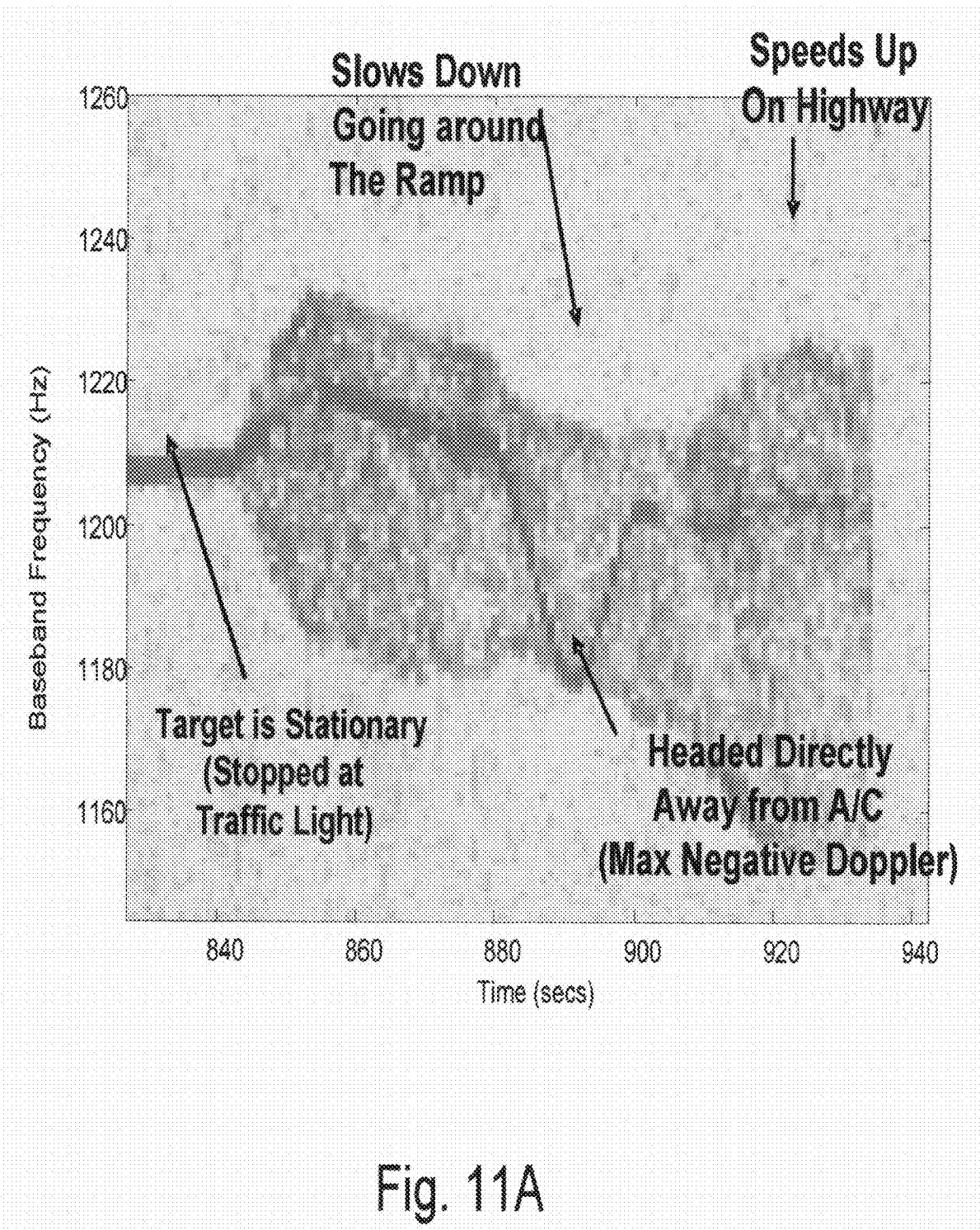
FIGS. 11A-11E illustrate the relationship between the multipath pedestal and slewed direct arrival component of a received signal for various transmitter paths.
Figure 11B:
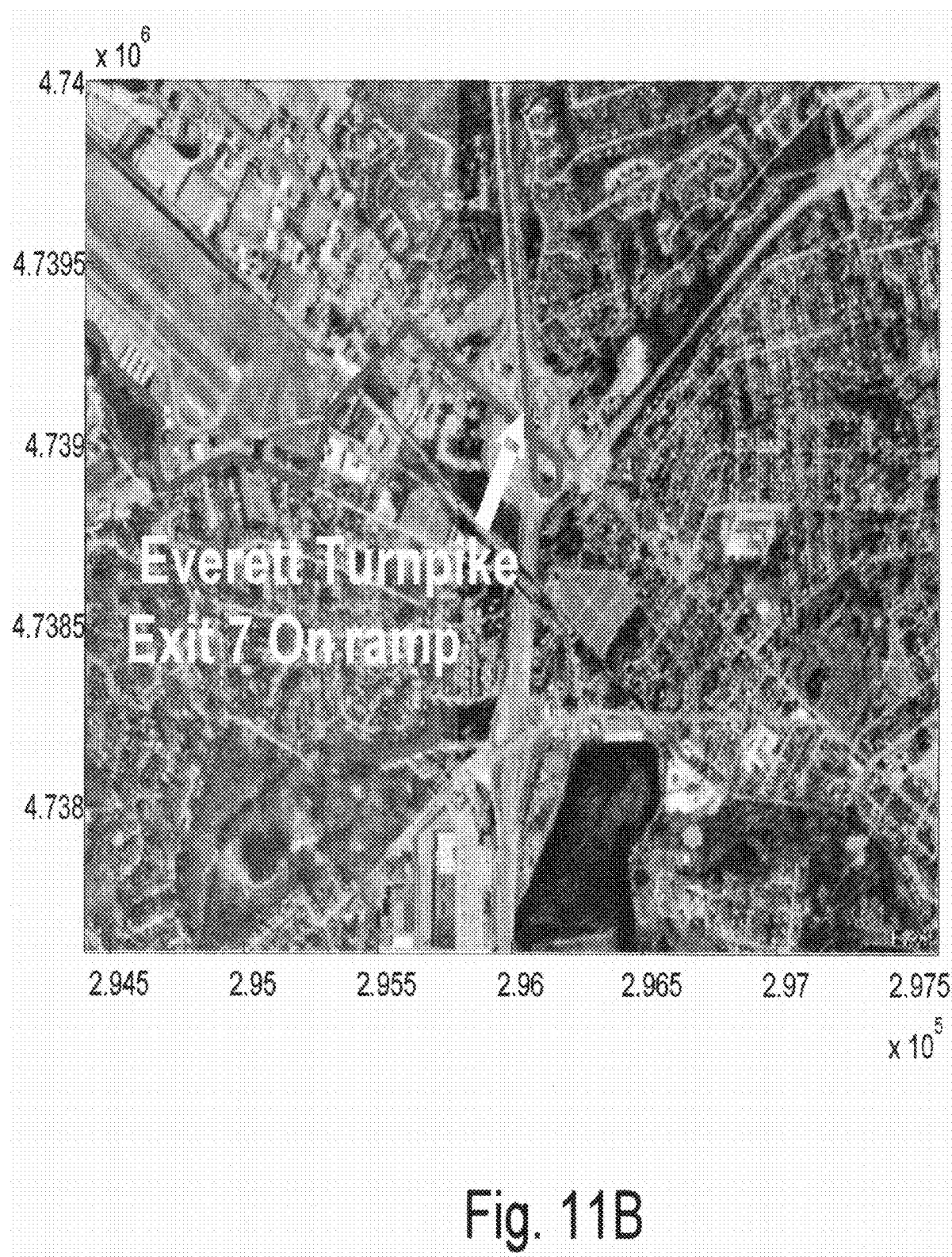

It is apparent from FIG. 10 and from the above discussions that the pedestal width W and frequency offset δ factors in a received signal 22R comprised of a direct arrival component 22D and a multipath pedestal 22P provide significant information about the path traversed by the transmitter 18 with regard to both direction and speed. The extent and degree of detail of this information is illustrated in FIGS. 11A through 11F wherein FIG. 11A is a frequency/time plot of the received signal 22R while the transmitter 18 traversed a known exit ramp along the path 18P between Nashua, N.H. and Manchester, N.H. and FIG. 11B is a vertical photograph/map of the exit ramp. It can been seen from a comparison of FIGS. 11A and 11B that the frequency/time plot of the direct arrival component 22D and pedestal 22P of received signal 22R contains a representation of the actual physical path followed by the transmitter 18, that is, of the path traversed by the vehicle bearing the transmitter 18, with the path being represented in terms of the speed and relative heading of the vehicle.

Figure 11D:
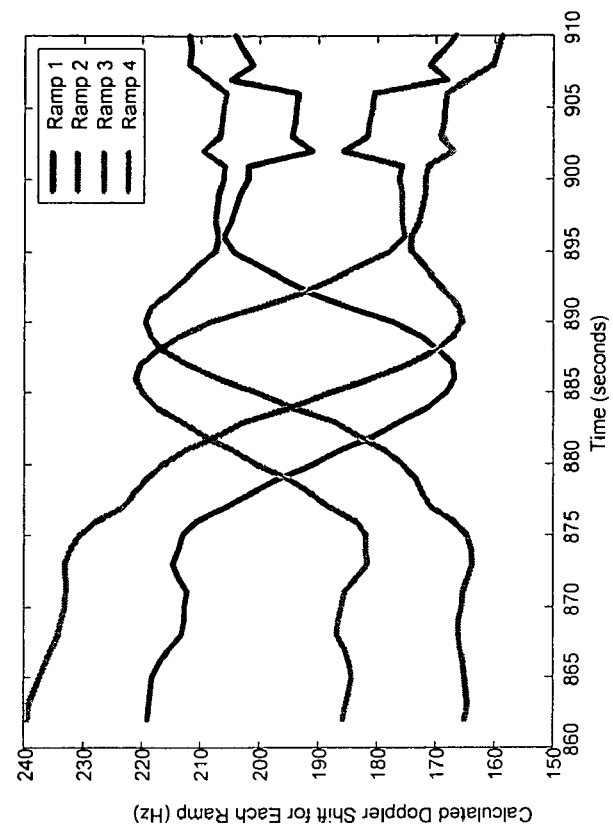
Figure 11C:
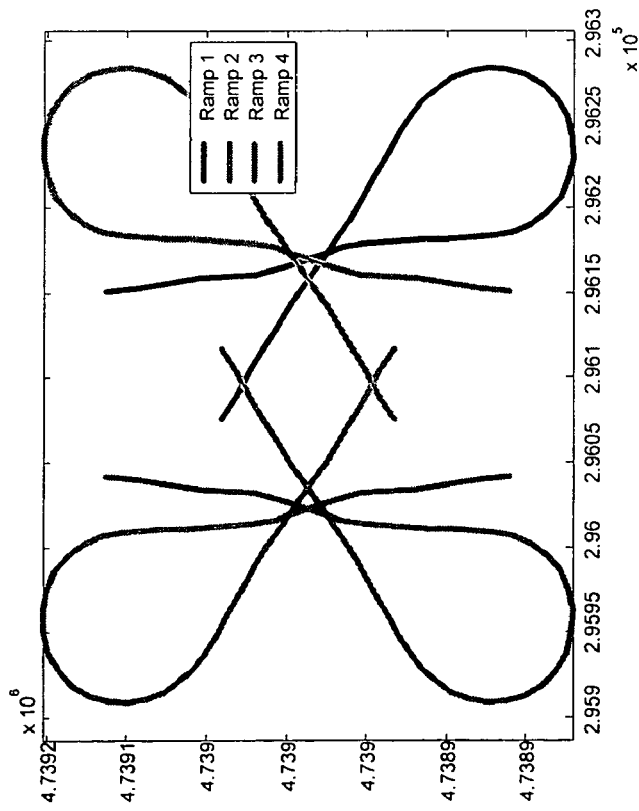
Figure 11E:
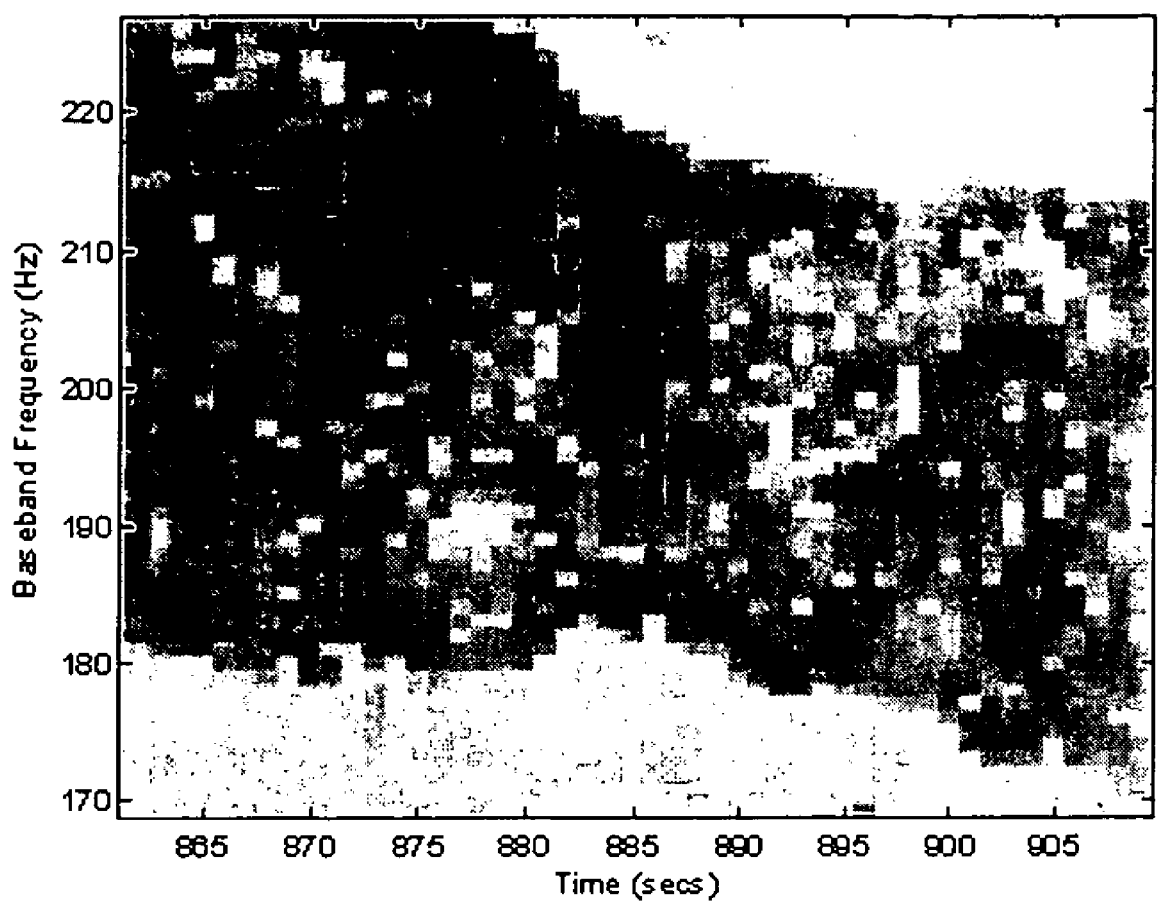

In further example, FIG. 11C is a diagrammatic representation of a known cloverleaf intersection along the path 18P while FIG. 11D is a set of calculated Doppler shift/time plots of a received signal 22R from a transmitter 18 traversing each of the ramps of the exemplary cloverleaf intersection at a predetermined speed or speed range wherein each plot is calculated for a corresponding ramp. FIG. 11E, in turn, is a frequency/time plot of an actual received signal 22R from a transmitter 18 physically traversing one of the ramps of the cloverleaf intersection. As described above, the pedestal width W and frequency offset δ of the direct arrival component 22D of the received signal 22R represents the speed and relative bearing of the vehicle over the indicated time period in which the vehicle is traversing one of the ramps. A comparison of the frequency/time plot of the actual received signal 22R with the predicted Doppler shift/time plots for the four ramps of the cloverleaf intersection shows a correspondence with one of the four ramps, thereby allowing identification of the specific cloverleaf ramp taken by the transmitter 18 by comparison of the predicted and actual characteristics of the received signal 22R.

According to the present invention, therefore, the speed and relative bearing information that can be extracted from a received signal 22R from a moving transmitter will allow the reconstruction and mapping of the path traversed by the transmitter. The above discussed direction finding method and apparatus for finding and tracking the location of a moving transmitter 18 is illustrated in FIG. 12 for the example illustrated in FIG. 7C wherein a transmitter 18 mounted on a vehicle traverses path 18P from Nashua, N.H. to Manchester, N.H. while the receiver 12 is mounted on an aircraft flying along path 30.

At this point it must be noted that the method and apparatus of the present invention requires only a single receiving antenna in the case when the transmitter is in motion, rather than the two DF antennas and reference antenna used when the transmitter is stationary.

Figure 12:
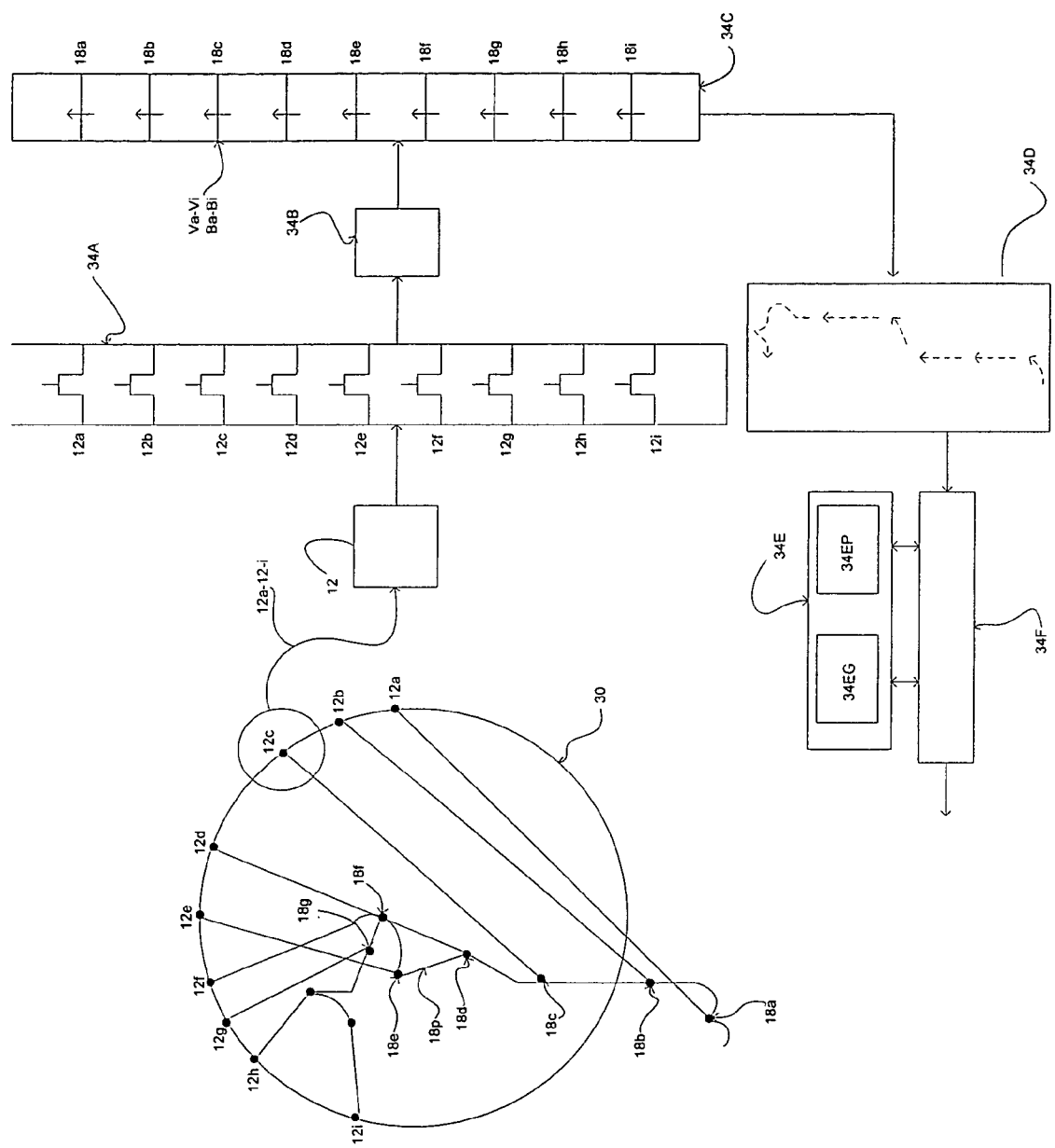
FIG. 12 is a diagrammatic representation of a direction finding and tracking system for a moving transmitter in a multipath environment.

In the simplified example of FIG. 12 the receiver 12 is represented as capturing received signal 22R at each of the sequence of receiver path points 12a-12i along path 30 and the corresponding locations of the transmitter 18 along path 18P are indicated as the sequence of transmitter path points 18a-18i. As illustrated in FIG. 12, at each of points 12a-12i receiver 12 captures the received signal 22R from transmitter 18 and provides an output 34A signal that includes information representing the multipath pedestal 22P and the direct arrival component 22D of signal 22R resulting at the corresponding one of receiver path points 12a-12i by the transmission from the corresponding one of transmitter path points 18a-18i. A pedestal width/frequency offset δ processor 34B extracts the pedestal width W information and frequency offset δ information from the current output of receiver 12 and generates, for each receiver path point 12a-12i and corresponding transmitter path point 18a-18i, an output 34C representing the corresponding absolute velocity Va-Vi of the transmitter 18 and relative bearing Ba-Bi of the transmitter 18 relative to the receiver 12 at that point 12a-12i/18a-18i.

The outputs 34C may then be used to construct a track map 34D representing the velocity and relative bearing of the transmitter at each point 12a-12i/18a-18i and, if the location of the receiver 12 is known at each of receiver path points 12a-12i, the track map 34D may represent the absolute velocity and physical bearing of the transmitter 18 at each of points 18a-18i. In this regard, it will be noted that while the physical bearing to each of transmitter path points 18a-18i from the corresponding receiver path points 12a-12i of receiver 12 along receiver path 30 has been determined, the actual distance between receiver 12 and transmitter 18 at each of these points has not been determined. As a consequence, there may be some ambiguity in the transmitter track mapping at this point. The actual geophysical path traversed by transmitter 18 may be resolved, however, in a number of ways.

On approach, for example, is by "dead reckoning" from a known starting or ending point of the transmitter path 18P. That is, the local bearing of the transmitter 18 at each point 18a-18i can be determined from the corresponding known relative bearing between the transmitter 18 and receiver 12, which has been determined as described above, and the known receiver 12 bearing for each corresponding receiver path point 12a-12i. The absolute speed and local bearing of the transmitter 18 at each transmitter path point 18a-18i could then be used to construct a dead reckoning plot of the path of the transmitter 18 from a known starting point, or be back tracking from a known ending point.

An alternate method using cross bearing from a second receiver would require additional resources, but would be simpler and more direct. This method would use a second receiver 12 that is generally synchronized with the first receiver 12 as regards their capture of their respective received signals 22R, thereby providing obtaining cross bearings for each transmitter path point 18a-18i.

An yet further method for determining the actual geophysical location of each transmitter path point 18a-18i is illustrated in FIG. 12 and is by comparison of the sequence of relative bearing/velocity captures 34C or 34D with a map or maps 34E of the possible transmitter paths 18P. In one embodiment of this method, the map or maps 34E could be geophysical maps 34EG and a matching processor 34F would compare the bearing/velocity captures 34C or 34D with the possible transmitter paths 18P represented in the geophysical map or maps 34EG, attempting to find a best match between the relative bearing/velocity captures and the geophysical paths 18P.

In yet another implementation of the present invention predicted received signal characteristic frequency/time plots 34EP would be generated for a range of possible or probable route segments or points and possible or probable speed ranges for an area of interest, such as specific sections of road or intersections through the area. The predicted received signal characteristic plots 34EP could, for example, contain information in the form of possible pedestal width W/frequency offset δ plots for selected points or segments along possible transmitter paths 18P. The pedestal width W/frequency offset δ extracted from the received signals 22R would then be compared with the stored pedestal width W/frequency offset δ plots 34EP to determine the best matches, if any, to identify the route segments or points best corresponding with the received data and thereby allowing identification and reconstruction of the actual path traversed by the transmitter.

It will be recognized that the generation of predicted received signal characteristic plots and the identification and tracing of traversed path segments in a given area will be effected by the range and complexity of the possible paths in the area. That is, the generation of predicted received signal characteristic plots for established roads and highways in a given area is relatively straightforward as the locations and paths followed by the roads and highways can be ascertained from, for example, topographical maps or satellite or aerial photographs or maps. The situation becomes more complex when, for example, it is necessary to consider "off road" paths and, in this instance, the generation of predicted received signal characteristic plots will depend upon the complexities of the terrain, such as how many practicable paths are possible in the terrain. The number of possible paths may be very limited in some terrain, such as in large areas of New England or the canyon country of the south-west, but could become very large for relatively level terrain with few obstacles. In the latter case, however, direct tracking of a vehicle as described above, rather than tracking by matching to predetermined plots, would be available and may in fact be preferable.

1. Direction Finding and Path Mapping for a Moving Transmitter in a Multipath Environment, Modulated Signal The above implementations of the present invention have been discussed with respect to systems wherein the transmitter 18 is emitting a continuous wave (CW) signal. The system and method of the present invention may be implemented, however, for modulated signals, such as transmissions carrying digital or analog data. The following will therefore discuss exemplary implementations of the present invention for systems using, for example, a quadrature phase shift keyed (QPSK) signal, wherein each transmitted "symbol" is represented by one of four possible phase shift angles, thereby allowing each transmitted "symbol" to represent two binary data bits.

Figure 13A:
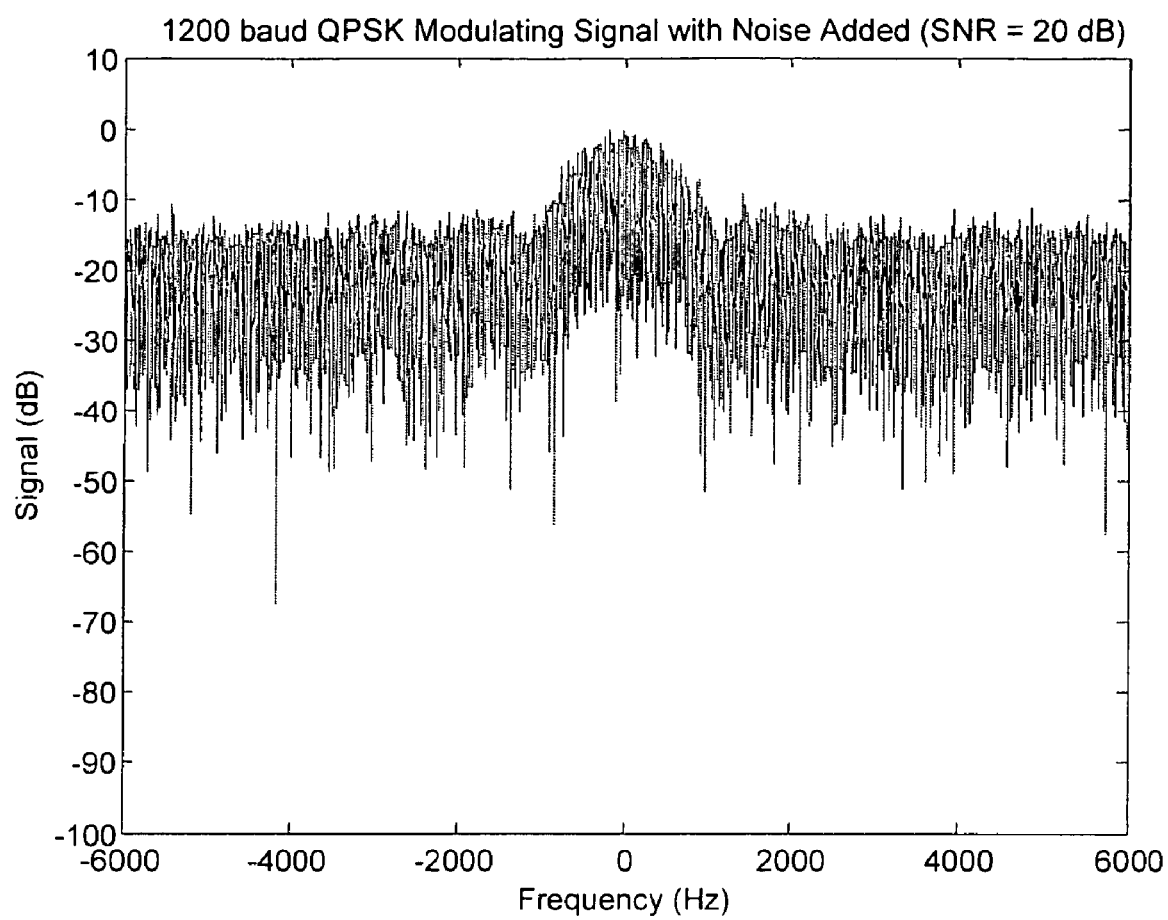
FIGS. 13A, 13B, 13C and 13D illustrate the recovery of a CW signal with multipath pedestal and slewed direct arrival components from a modulated signal; and, FIG. 14 is an illustration of navigational location of a receiver in a multipath environment.
Figure 13B:
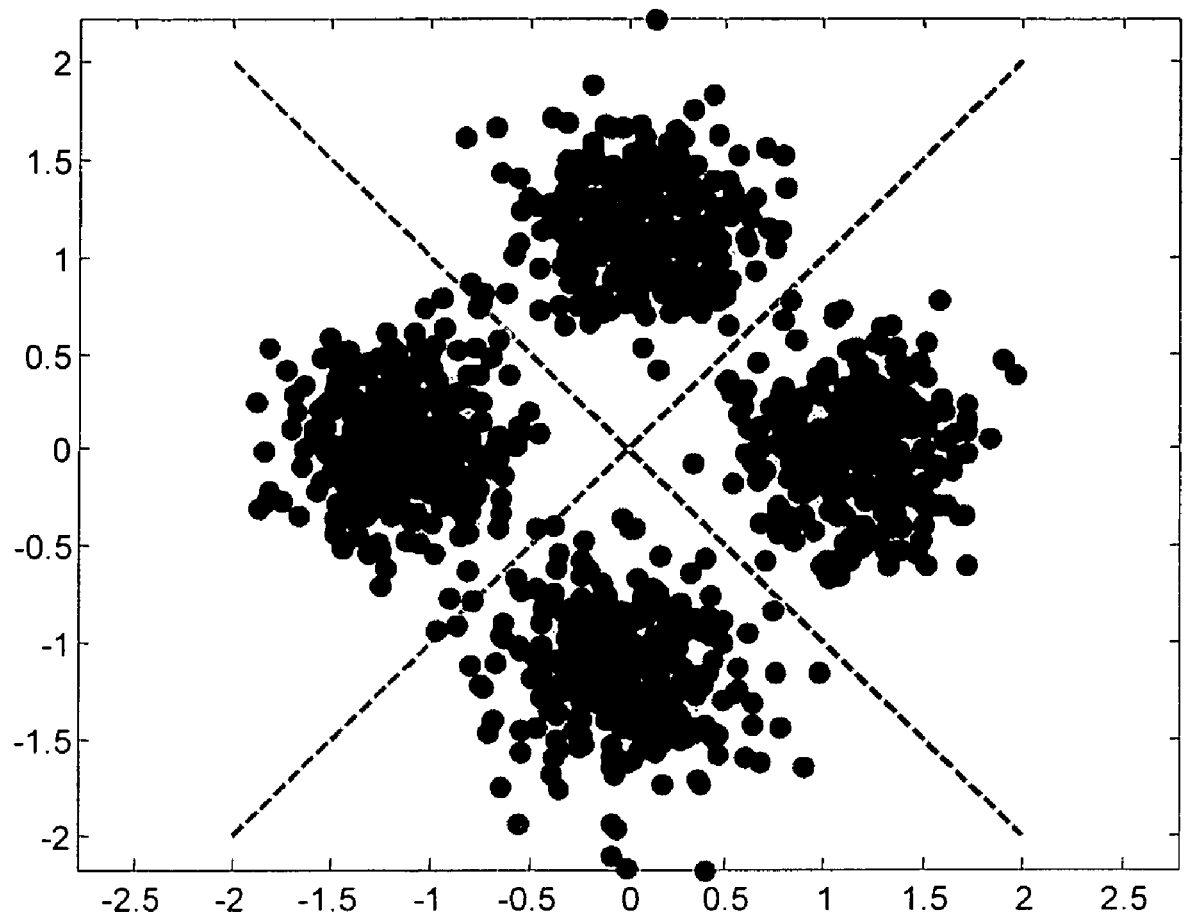

FIGS. 13A and 13B are illustrations of exemplary QPSK signals wherein FIG. 13A is an amplitude/frequency representation of a QPSK signal with white Gaussian noise and multipath effects. FIG. 13B is a "constellation" map of a QPSK signal with white Gaussian noise and multipath effects. As is well understood by those of ordinary skill in the relevant arts, a constellation map for a QPSK signal divides the signal space into four quadrants separated by diagonal "decision lines" wherein the crossing point of the decision lines represents the carrier frequency of the QPSK signal. Each quadrant represents one of the four possible phase angle encodings of a corresponding information symbol and the decision lines represent the decision thresholds determining to which quadrant a received symbol represented by a phase angle is assigned.

Figure 13C:
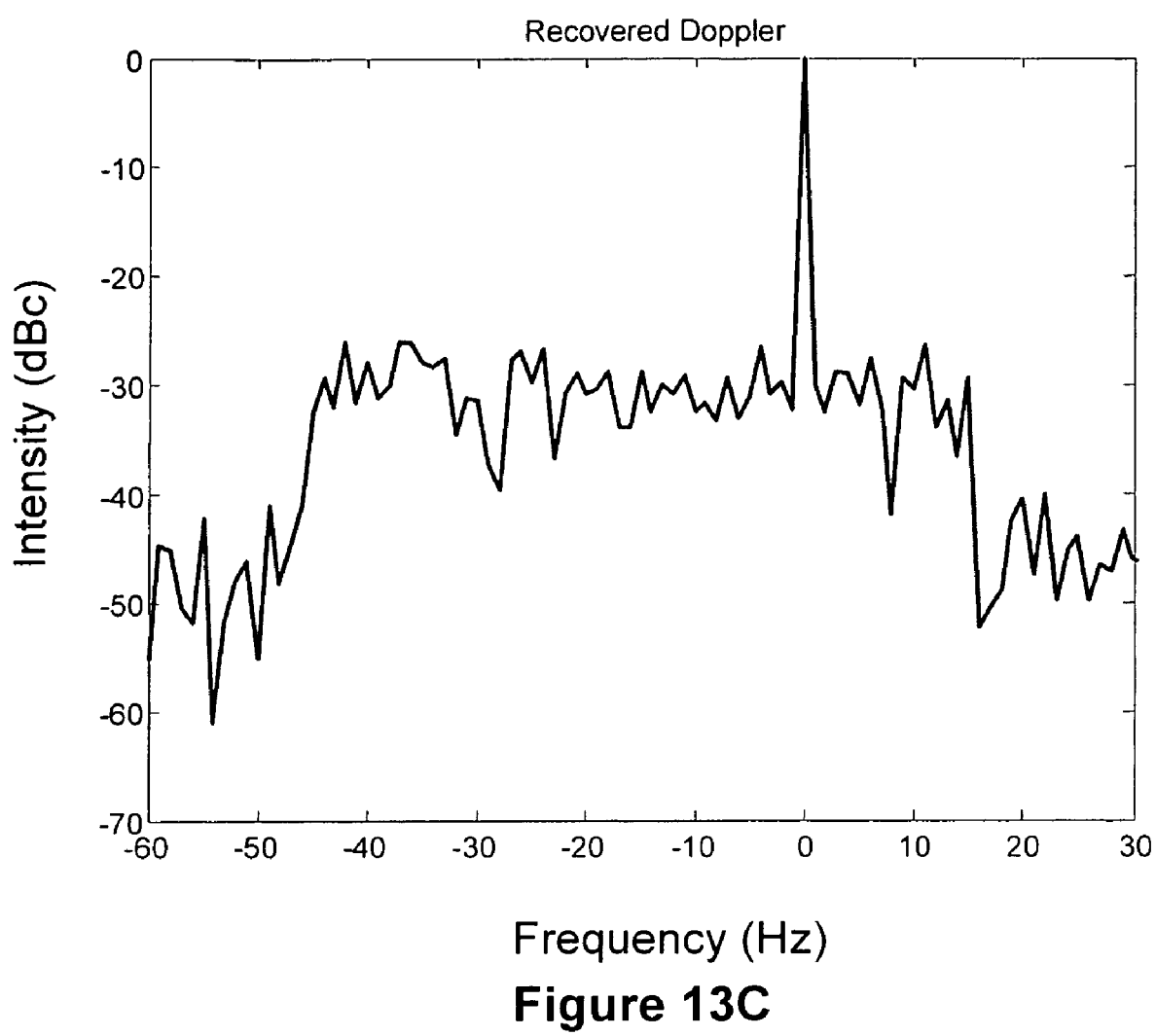
Figure 13D:
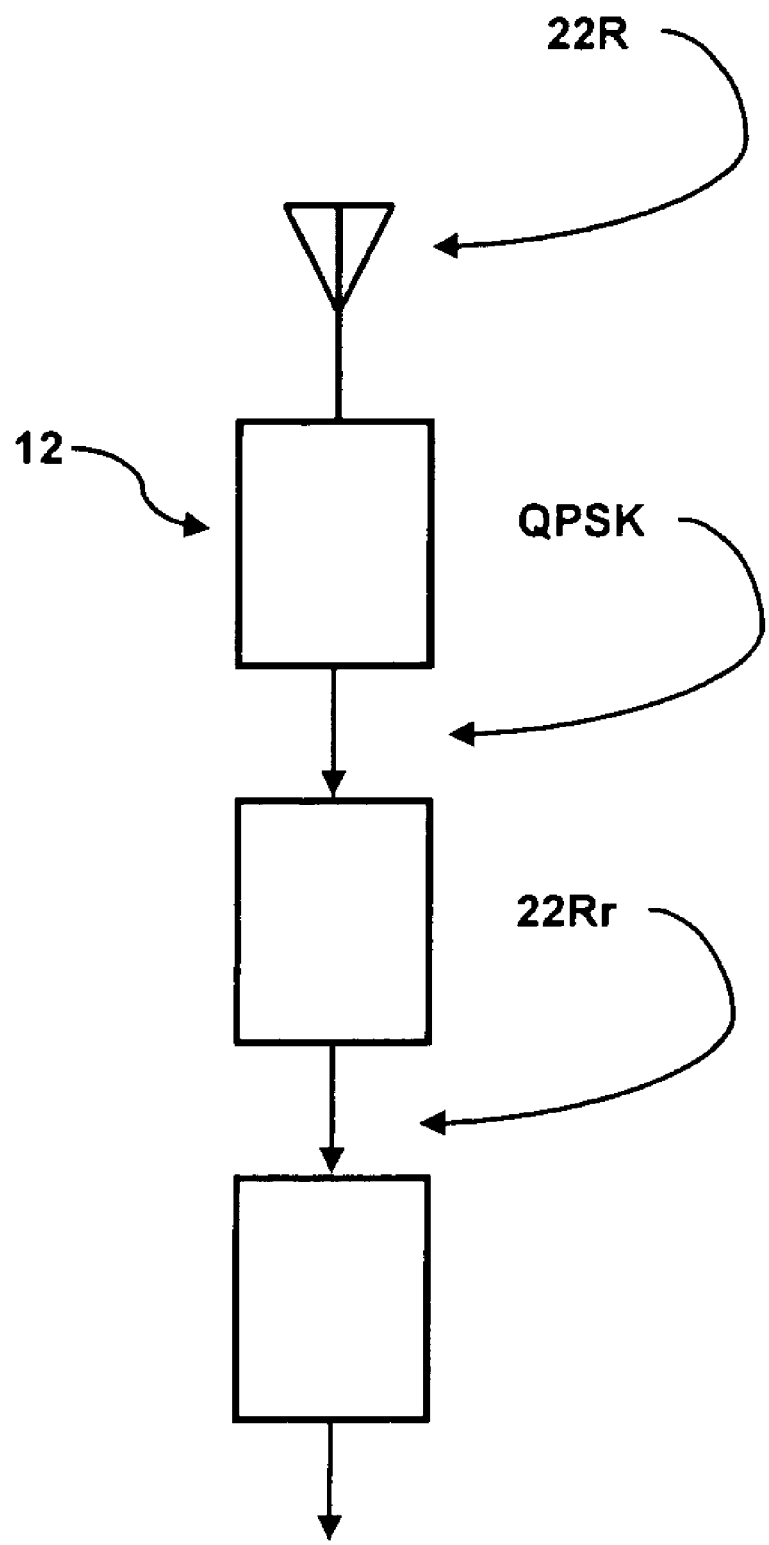

FIG. 13C, in turn, is an illustrative frequency/amplitude plot of a received signal 22R that has been received in QPSK format and that has been recovered from the QPSK format by conventional demodulation/remodulation processing as illustrated in FIG. 13D to effectively convert the received modulated signal into a continuous wave signal, thereby recovering the multipath and direct arrival components. As indicated therein, receiver 12 receives signal 22R, which is in QPSK format. Receiver 12 provides the received QPSK format signal to a demodulator/modulator 36, which demodulates and re-modulates the QPSK signal to generate a recovered signal 22Rr having the pedestal 22P and direct arrival component 22D characteristics illustrated in FIG. 13C.

As shown, the resulting recovered received signal 22Rr contains all of the characteristics previously illustrated and discussed with regard to FIG. 9. That is, the recovered signal 22R includes a multipath pedestal 22P having a frequency width W determined by the absolute velocity of the transmitter 18 and a direct arrival component 22D having height H proportional to the "roughness" of the terrain in which the transmitter 18 is located and a frequency offset δ within the multipath pedestal 22P proportional to the transmitter 18 heading relative to the receiver 12. The recovered signal 22Rr is then processed by a pedestal width/frequency offset δ processor 34B as shown in FIG. 12 to provide the desired pedestal width W and frequency offset δ outputs, which may be employed as described herein above.

It is therefore apparent that the method and apparatus of the present invention may be implemented for modulated signals as well as continuous wave signals by suitable processing of the received signal to effectively convert the received modulated signal into a continuous wave signal to recover the multipath component 22M and direct arrival component 22D of the received signal.

C. Navigation in a Multipath Environment

Lastly, consideration of the above discussions will show that it is possible to use the above described methods and apparatus of the present invention for navigational purposes, as illustrated in FIG. 14. In this instance the location of the receiver 12 may be determined so long as there is relative motion between the receiver 12 and a pair of transmitters 18 having known locations and transmitting CW or modulated signals and so long as the receiver 12 is in motion along a known heading. The received signal 22R from each transmitter 18 will thereby either contain a pedestal component 22P and a direct arrival component 22D, or a pedestal component 22P and a direct arrival component 22D can be recovered from the received signal 22R by demodulation/remodulation methods as described above. The location of the direct arrival component 22D within the Doppler pedestal 22P of each received signal 22R will then indicate the relative bearing of the corresponding transmitter 18 with respect to the moving receiver 12, and the intersection of the headings will indicate the current location of the receiver 12.

In conclusion, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims.

What is claimed is:

1. A method for determining a direction of a direct arrival path between a receiver and a transmitter in a multipath environment wherein a received signal at the receiver includes a direct path signal component of a transmitted signal and a plurality of multipath signal components of the transmitted signal and wherein the transmitter is in motion, comprising the steps of:
   identifying in the received signal
      a doppler pedestal comprised of a plurality of multipath signal components having a range of doppler shifts, each multipath doppler shift being determined by a relative motion between a scatterer and at least one of the transmitter and the receiver, and
      a direct path signal component, and
   determining at least one of
      a transmitter heading relative to the receiver as proportional to a frequency offset of the direct path signal component relative to the multipath pedestal, and
      an absolute velocity of the transmitter as proportional to a width of the multipath pedestal.

2. The method of claim 1 for determining a direction of a direct arrival path between a receiver and a transmitter in a multipath environment wherein a received signal at the receiver includes a direct path signal component of a transmitted signal and a plurality of multipath signal components of the transmitted signal and wherein the transmitter is in motion, further comprising the step of:
   determining a relative velocity between the transmitter and the receiver as proportional to a magnitude and a direction of doppler shift of the direct arrival component of the received signal relative to the doppler pedestal.

3. The method of claim 1 for determining a direction of a direct arrival path between a receiver and a transmitter in a multipath environment wherein a received signal at the receiver includes a direct path signal component of a transmitted signal and a plurality of multipath signal components of the transmitted signal and wherein the transmitter is in motion, further comprising the step of:
   determining a number and magnitude of scatterers in the multipath environment as proportional to an amplitude of the multipath pedestal.

4. The method of claim 1 for determining a direction of a direct arrival path between a receiver and a transmitter in a multipath environment wherein a received signal at the receiver includes a direct path signal component of a transmitted signal and a plurality of multipath signal components of the transmitted signal and wherein the transmitter is in motion, wherein:
   the transmitted signal is a continuous wave signal.

5. The method of claim 1 for determining a direction of a direct arrival path between a receiver and a transmitter in a multipath environment wherein a received signal at the receiver includes a direct path signal component of a transmitted signal and a plurality of multipath signal components of the transmitted signal and wherein the transmitter is in motion, further comprising the initial step of:
   when the transmitted signal is a modulated signal,
      transforming the received modulated signal into a continuous wave signal by demodulation/remodulation processing.

6. A method for determining a direction of a direct arrival path between a receiver and a transmitter and mapping a path traversed by the receiver in a multipath environment wherein a received signal at the receiver includes a direct path signal component of a transmitted signal and a plurality of multipath signal components of the transmitted signal and wherein the transmitter is in motion. comprising the steps of:

identifying in the received signal a doppler pedestal comprised of a plurality of multipath signal components having a range of doppler shifts, each multipath doppler shift being determined by a relative motion between a scatterer and at least one of the transmitter and the receiver, and a direct path signal component. and determining at least one of a transmitter heading relative to the receiver as proportional to a frequency offset of the direct path signal component relative to the multipath pedestal. and an absolute velocity of the transmitter as proportional to a width of the multipath pedestal, recording successive transmitter headings relative to the receiver and absolute velocities of the transmitter over a sequence of intervals during which the transmitter traverses a path, and correlating the recorded transmitter headings and absolute velocities with corresponding geographical locations along the path to generate a map of the geographic map expressed in transmitter headings and absolute velocities.

7. A method for determining a direction of a direct arrival path between a receiver and a transmitter and determining a geographic a path traversed by the receiver in a multipath environment wherein a received signal at the receiver includes a direct path signal component of a transmitted signal and a plurality of multipath signal components of the transmitted signal and wherein the transmitter is in motion, comprising the steps of:

identifying in the received signal a doppler pedestal comprised of a plurality of multipath signal components having a range of doppler shifts, each multipath doppler shift being determined by a relative motion between a scatterer and at least one of the transmitter and the receiver, and a direct path signal component, and determining at least one of a transmitter heading relative to the receiver as proportional to a frequency offset of the direct path signal component relative to the multipath pedestal, and an absolute velocity of the transmitter as proportional to a width of the multipath pedestal, determining successive transmitter headings relative to the receiver and absolute velocities of the transmitter over a sequence of intervals during which the transmitter traverses a path, and correlating the determined transmitter headings and absolute velocities with at least one stored path map representing corresponding geographical locations along a path expressed in transmitter headings and absolute velocities.

\* \* \* \* \*